(12) United States Patent
Togino

(10) Patent No.: US 7,362,517 B2
(45) Date of Patent: Apr. 22, 2008

(54) ROTATIONALLY ASYMMETRIC OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/410,230

(22) Filed: Apr. 25, 2006

(65) Prior Publication Data

US 2006/0238879 A1   Oct. 26, 2006

(30) Foreign Application Priority Data

Apr. 25, 2005   (JP)   ............................. 2005-126085

(51) Int. Cl.
*G02B 13/06* (2006.01)
*G02B 17/00* (2006.01)
*G02B 3/02* (2006.01)
*H04N 7/00* (2006.01)

(52) U.S. Cl. ...................... 359/725; 359/726; 359/720; 348/36

(58) Field of Classification Search ................ 359/720, 359/726–732, 668–670, 664, 649; 348/36, 348/38

See application file for complete search history.

(56) References Cited

U.S. PATENT DOCUMENTS

| 5,854,713 | A | 12/1998 | Kuroda et al. | |
|---|---|---|---|---|
| 6,373,642 | B1 * | 4/2002 | Wallerstein et al. | ........ 359/727 |
| 2003/0043261 | A1 | 3/2003 | Gianchandani et al. | |

FOREIGN PATENT DOCUMENTS

JP    3220462    8/2001

* cited by examiner

*Primary Examiner*—Alicia M Harrington
(74) *Attorney, Agent, or Firm*—Kenyon & Kenyon LLP

(57) ABSTRACT

The invention relates to a rotationally asymmetric optical system which includes at least one reflecting surface rotationally symmetric about a center axis, is rotationally symmetric about the center axis, and is adapted to form a full 360°-direction image on an image plane or project an image located on the image plane at a full 360°-direction angle of view, and a rotationally asymmetric optical element which is located in such a way as to surround the full circumference of the entrance surface of the full-panoramic optical system in order of travel of light rays in the case of an image-formation optical system, and in reverse order of travel of light rays in the case of a projection optical system, and is rotationally asymmetric about the center axis.

20 Claims, 27 Drawing Sheets

ROTATIONALLY ASYMMETRIC OPTICAL SYSTEM

This application claims benefits of Japanese Application No. 2005-126085 filed in Japan on Apr. 25, 2005, the contents of which are incorporated by this reference.

BACKGROUND OF THE INVENTION

The present invention relates generally to a rotationally asymmetric optical system, and more particularly to a rotationally asymmetric optical system that is of size small, and resolution good, enough for use on all sky cameras, all sky projectors, etc., designed to form on an image plane an image having a full 360°-direction angle of view or project an image located on the image plane onto a full 360°-direction angle of view, and that enables, for instance, an image in a specific direction to be picked up or projected on a more enlarged or reduced scale than an image in other direction.

Various full-panoramic optical systems using a catoptric or catadioptric system rotationally symmetric about a center axis to obtain a full 360°-direction (full-panoramic) image have been known from, for instance, Patent Publications 1-13.

In particular, Patent Publication 7 refers to a full-panoramic optical system of the zoom type adapted to implement zooming by the movement, transformation, and replacement of a reflecting mirror that forms the catoptric optical system.

List of the Patent Publications

1. JP(B)6-85019
2. JP(A)60-42728
3. JP(A)10-54939
4. JP(A)11-331654
5. JP(A)2003-167195
6. U.S. Pat. No. 2,925,573
7. U.S. Pat. No. 3,220,462
8. U.S. Pat. No. 3,580,542
9. U.S. Pat. No. 3,283,653
10. U.S. Pat. No. 3,552,820
11. U.S. Pat. No. 4,566,763
12. U.S. Pat. No. 5,473,474
13. US(A)2003/0043261
14. US(A)2004/0008423

However, any of such full-panoramic optical systems, because of being rotationally symmetric about the center axis, is not designed to differ in magnification and angle-of-view directions depending on an azimuth, and the zoom type proposed in Patent Publication 7 is capable of zooming in the meridional direction (sectional direction inclusive of the center axis) alone; it is incapable of zooming in the sagittal direction that is a sectional direction orthogonal thereto.

SUMMARY OF THE INVENTION

In view of such problems with the prior art as described above, the present invention has for its object the provision of a rotationally asymmetric optical system wherein a rotationally asymmetric optical element is added to a full-panoramic optical system adapted to form on an image plane an image having a full 360°-direction angle of view or project an image located on the image plane onto a full 360°-direction angle of view, so that an image in a specific direction can be more enlarged or reduced than an image in other direction, or an image in a specific direction can be picked up or projected in an angle-of-view direction different from other angle-of-view direction.

According to the invention, this object is achievable by the provision of a rotationally asymmetric optical system, characterized by comprising a full-panoramic optical system which includes at least one reflecting surface rotationally symmetric about a center axis, is rotationally symmetric about the center axis, and is adapted to form a full 360°-direction image on an image plane or project an image located on the image plane onto a full 360°-direction angle of view, and a rotationally asymmetric optical element which is located in such a way as to surround the full circumference of the entrance surface of said full-panoramic optical system in order of travel of light rays in the case of an image-formation optical system, and in reverse order of travel of light rays in the case of a projection optical system, and is rotationally asymmetric about the center axis.

Desirously in one embodiment of the invention, said rotationally asymmetric optical element differs in angular magnification depending on an azimuth, or in an angle of deflection in a direction along the center axis depending on an azimuth.

When the rotationally asymmetric optical element differs in angular magnification depending on an azimuth, it is desirous that a light beam incident at each azimuth from the entrance surface of said full-panoramic optical system in order of travel of light rays in the case of the image-formation optical system, and in reverse order of travel of light rays in the case of the projection optical system, passes through said full-panoramic optical system to form an image at a position of the image plane off the center axis, and said rotationally asymmetric optical element differs in at least one of angular magnification in a section including the center axis and angular magnification in a section that is orthogonal to the first-mentioned section and includes a center light ray of that light beam, depending on an azimuth.

Said rotationally asymmetric optical element could be formed of a refracting surface alone or include a reflecting surface.

Here let $\Delta Pm$ be indicative of a change of power in the section including the center axis due to an azimuth and $\Delta Ps$ be indicative of a change of power in the section that is orthogonal to the section including the center axis and includes the center light ray. It is then desired to satisfy the following conditions (1) and (2):

$$\Delta Pm < 0.1 (1/\text{mm}) \qquad (1)$$

$$\Delta Ps < 0.1 (1/\text{mm}) \qquad (2)$$

In one embodiment of the invention, said rotationally asymmetric optical element could be located rotatably about the center axis, and in another embodiment of the invention, a second rotationally asymmetric element could be located in such a way as to surround the full circumference of said rotationally asymmetric optical element, and it could be located rotatably about said rotationally asymmetric optical element and about an axis parallel with the center axis.

In one embodiment of the invention, it is desired that the entrance pupil of said full-panoramic optical system in the section including the center axis is positioned near a transmitting surface that forms said entrance surface of said full-panoramic optical system.

In one embodiment of the invention, it is desired that at least one reflecting surface of said full-panoramic optical system has a rotationally symmetric shape defined by rotation about the center axis of a line segment of any desired shape including an odd-number degree term.

In one embodiment of the invention, it is desired that said full-panoramic optical system has a flare stop located near the entrance surface in the section including the center axis, wherein said flare stop is operable to limit an aperture in only the section including the center axis.

According to the rotationally asymmetric optical system of the invention adapted to take an image having a full 360°-direction (full-panoramic) angle of view or project an image onto a full 360°-direction (full-panoramic) angle of view, it is possible to form an image in a specific direction on a more enlarged or reduced scale than an image in other direction, or pick up or project an image while an angle-of-view direction in a specific direction is different from an angle-of-view direction in other direction.

Still other objects and advantages of the invention will in part be obvious and will in part be apparent from the specification.

The invention accordingly comprises the features of construction, combinations of elements, and arrangement of parts which will be exemplified in the construction set forth, and the scope of the invention will be indicated in the claims.

DESCRIPTION OF THE PREFERRED EMBODIMENTS

The rotationally asymmetric optical system of the invention is now explained with reference to several embodiments.

Figure 1:
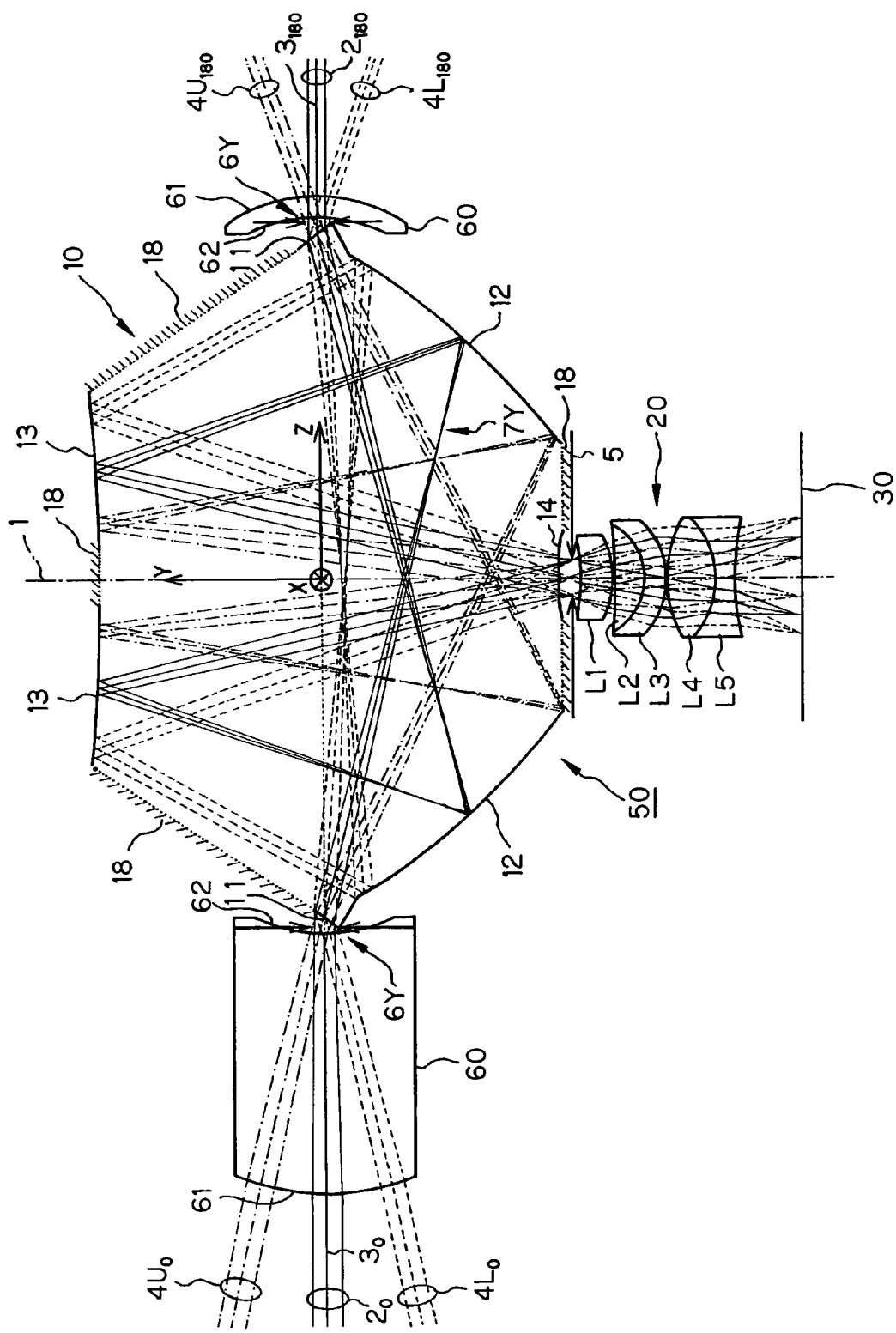
FIG. 1 is a sectional view of the full-panoramic optical system in the rotationally asymmetric optical system according to Example 1 of the invention, as viewed along its center axis and including a center light ray from a direction of azimuth 0° and a center light ray from a direction of azimuth 180°.
Figure 2:
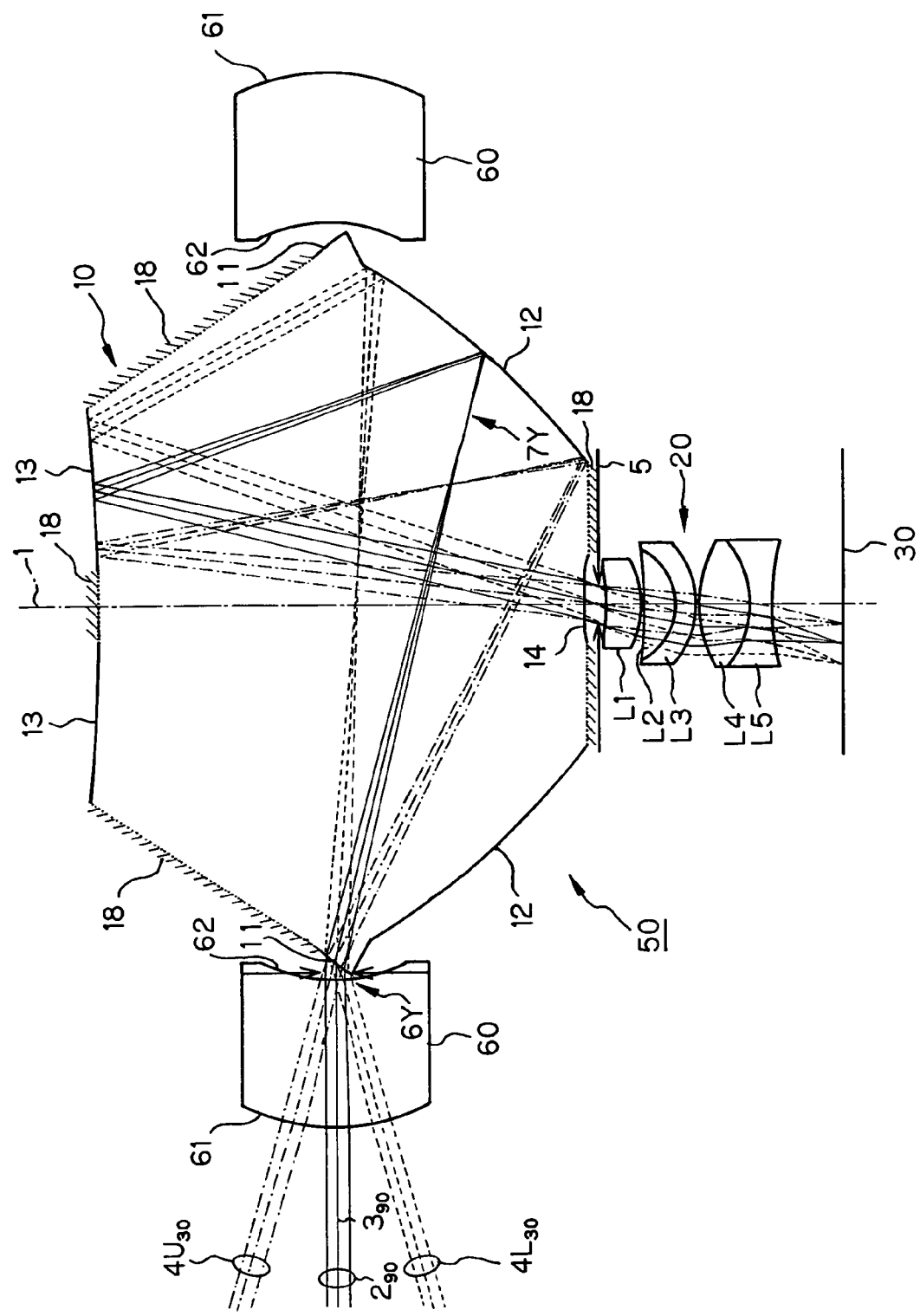
FIG. 2 is a sectional view of the full-panoramic optical system in the rotationally asymmetric optical system according to Example 1 of the invention, as viewed along its center axis and including a center light ray from a direction of azimuth 0°
Figure 3:
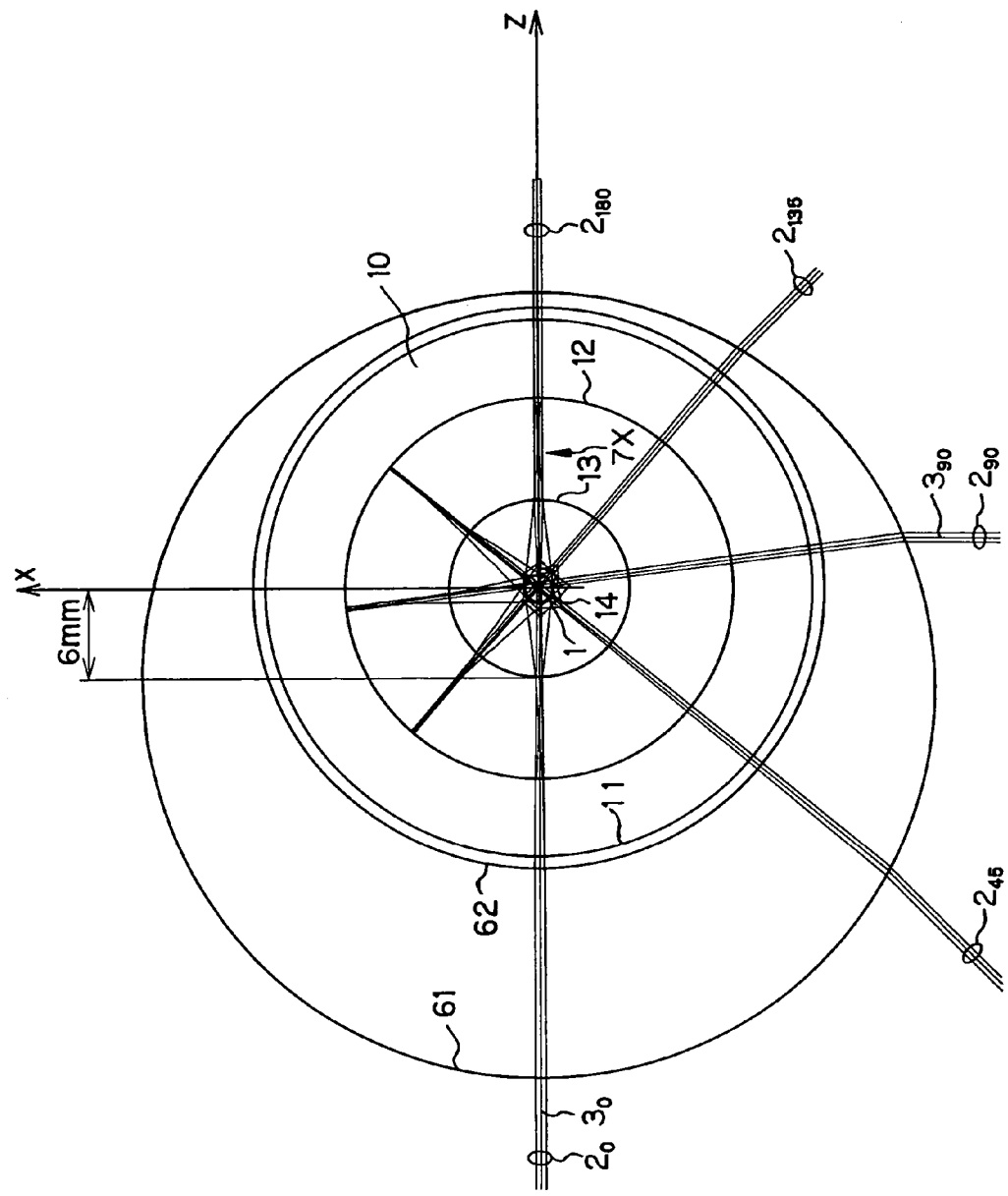
FIG. 3 is a plan view of the full-panoramic optical system in the rotationally asymmetric optical system according to Example 1, as an optical path is projected onto a plane orthogonal to its center axis.

FIG. 1 is illustrative in section, as taken along a center axis (rotationally symmetric axis) 1, of a full-panoramic optical system 50 in the rotationally asymmetric optical system of Example 1, described later, including a center ray (chief ray) $3_0$ from a 0°-azimuth direction and a center ray (chief ray) $3_{180}$ from an 180°-azimuth direction; FIG. 2 is illustrative in section, as taken along the center axis (rotationally symmetric axis) 1, of that full-panoramic optical system including a center ray (chief ray) $3_{90}$ from a 90°-azimuth direction; and FIG. 3 is a plan view of an optical path as projected onto an X-Z plane orthogonal to that center axis (rotationally symmetric axis) 1. The optical system of the invention is now explained with reference to FIGS. 1, 2 and 3. Notice here that the optical system is explained as an image-formation optical system; however, if the optical path is reversed, it could be used as a projection optical system adapted to project an image onto a full-360° (panoramic) direction. Note also that only center light beams $2_0$, $2_{45}$, $2_{90}$, $2_{135}$ and $2_{180}$ from directions having azimuths of 0°, 45°, 90°, 135° and 180°, respectively, are indicated in FIG. 3, and that to make mutual distinctions between light beams and center rays from the respective directions, the azimuths belonging to them are indicated by numerical subscripts.

The full-panoramic optical system 50 used here comprises an optical system rotationally symmetric about the center axis 1, which comprises an entrance surface 11 that is configured into a shape rotationally symmetric about the center axis 1 and receives light beams $2_0$, $2_{45}$, $2_{90}$, $2_{135}$, $1_{180}$, $4U_0$, $4U_{45}$, $4U_{90}$, $4U_{135}$, $4U_{180}$, $4L_0$, $4L_{45}$, $4L_{90}$, $4L_{135}$, $4L_{180}$, etc. (for instance, the light beam $4L_0$ is one incident from the sky side in the distance and the light beam 4L0 is one incident from the ground side in the distance, with an image plane 30 directed to the zenith) and at least one reflecting surface 12, 13 that is configured into a rotationally symmetric shape. For such an optical system, various catoptric or catadioptric systems rotationally symmetric about the center axis, known typically from Patent Publications 1-13, could be used. The full-panoramic optical system of FIGS. 1-3 is similar to that set forth in Example 2 of Japanese Patent Application No. 2005-27823. One embodiment of the full-panoramic optical system 50 is shown in Example 1 given later, and other embodiments of the full-panoramic optical system will be described later.

And then, the light beams $2_0$, $2_{45}$, $2_{90}$, $2_{135}$, $1_{180}$, etc. incident from an object in the distance in the full (panoramic) direction on the entrance pupil 6Y of the full-panoramic optical system 50 enters the entrance surface 11 of the full-panoramic optical system 50 and then passes through the reflecting surfaces 12, 13, the refracting surface 14, a stop 5 and lenses L1 to L5 in this order, forming on the image plane 30 vertical to the center axis 1 an annular image coaxial with the center axis 1.

In the invention, a cylindrical form of rotationally asymmetric optical element 60 is located in such a way as to surround the full circumference of the entrance surface 11 of the full-panoramic optical system 50, and the light beams $2_0$, $2_{45}$, $2_{90}$, $2_{135}$, $1_{180}$, etc. coming from an object in the distance enter the entrance surface 11 of the full-panoramic optical system 50 via the rotationally asymmetric optical element 60, and then passes the full-panoramic optical system 50, forming an azimuth direction-depending image at a position of the image plane 30 vertical to the center axis 1, which position is off the center axis 1.

Herein, both the meridional and sagittal section shapes of the rotationally asymmetric optical element 60 differ continuously or discontinuously in an azimuth direction, and so that optical system 60 differs in angular magnification and deflection direction depending on the azimuth direction. In the embodiment of FIG. 1, the angular magnification differs continuously. Here, the meridional section is defined by a section that includes the center axis (rotationally symmetric axis) 1 of the full-panoramic optical system 50 and a center ray (chief ray) $3_0$, etc. of the center light beam $2_0$, etc. arriving at the center of an angle of view (meridional angle of view) in a direction along that center axis (rotationally symmetric axis) 1, and the sagittal section is defined by a section that is orthogonal to that meridional section and includes the center ray (chief ray) $3_0$, etc. Corresponding to the axial chief ray for a rotationally symmetric diotric system, the center ray (chief ray) $3_0$ or the like means a light ray that passes through the center of the stop 5 in the full-panoramic optical system 50 and arrives at the center of the angle of view in the meridional direction.

With the optical system of the invention, therefore, when the rotationally asymmetric optical element 60 differs in angular magnification depending on azimuth directions, there is an image formed on the image plane 30, which image differs in the magnification in both the meridional direction (section direction including the center axis 1) and the sagittal direction depending on an azimuth.

Figure 4:
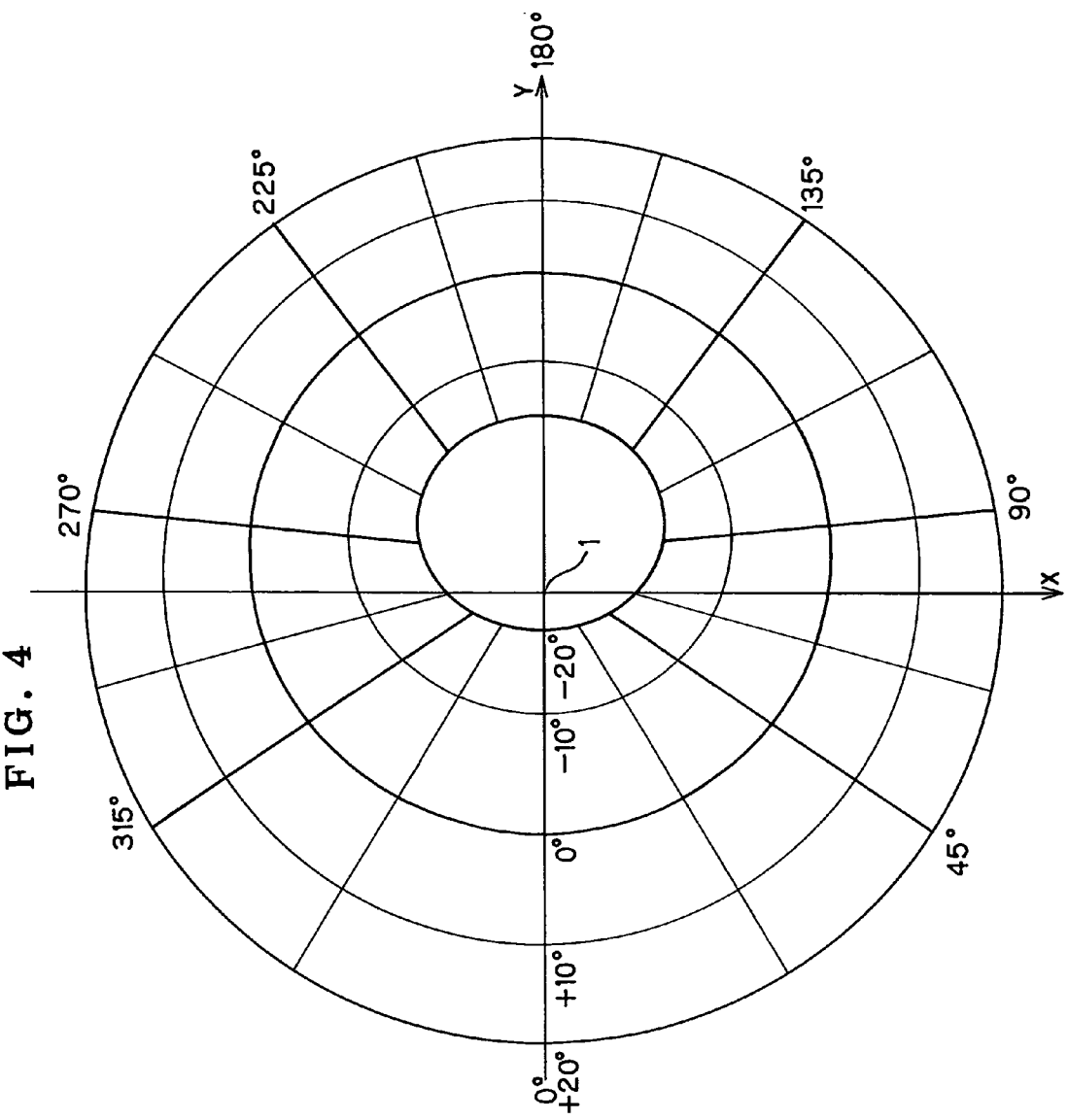
FIG. 4 is a schematic representation of the magnification of an image formed on the image plane of the rotationally asymmetric optical system according to Example 1.
Figure 5:
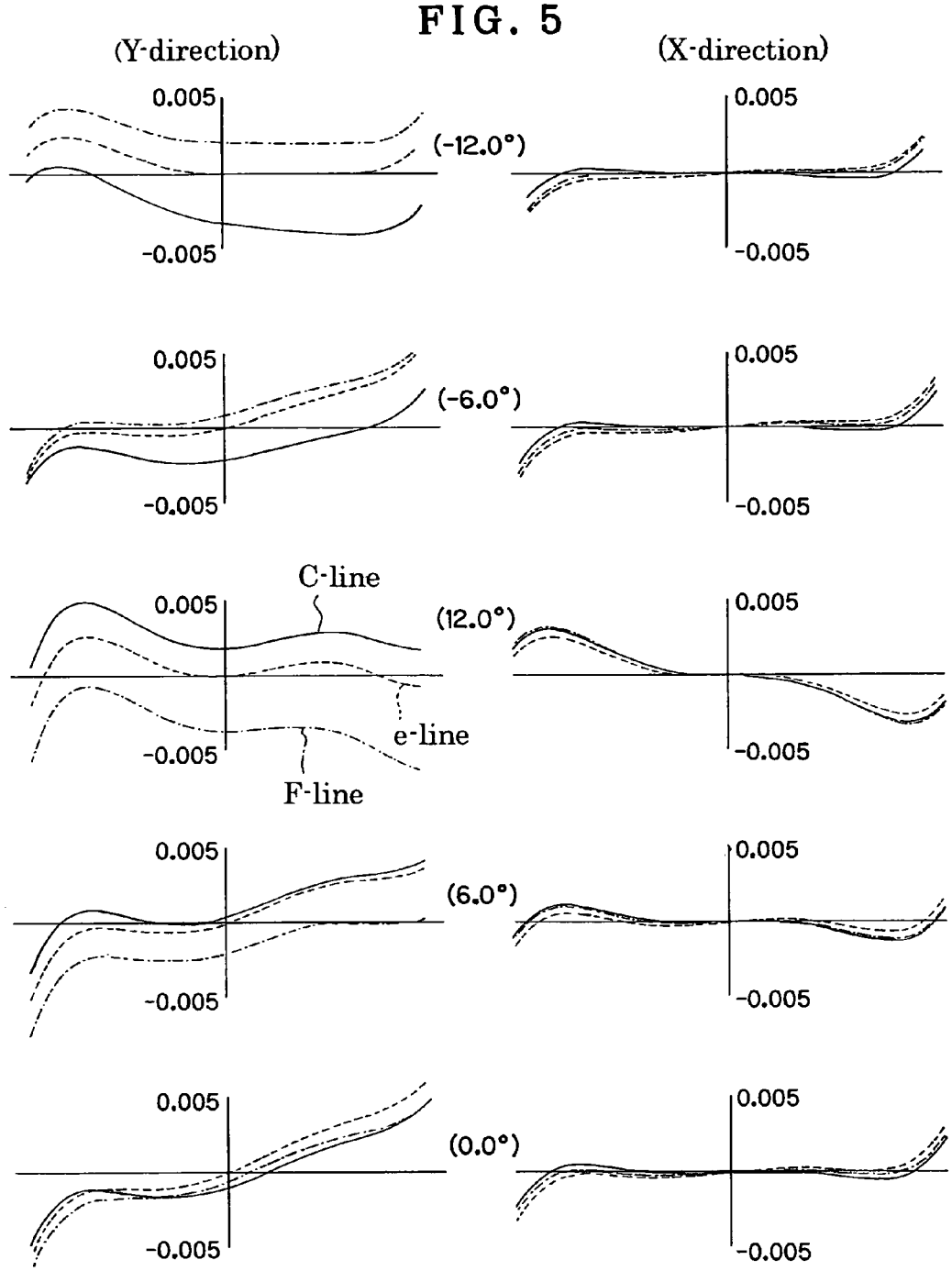
FIG. 5 is illustrative of transverse aberrations at an azimuth of 0° of the whole optical system according to Example 1.
Figure 6:
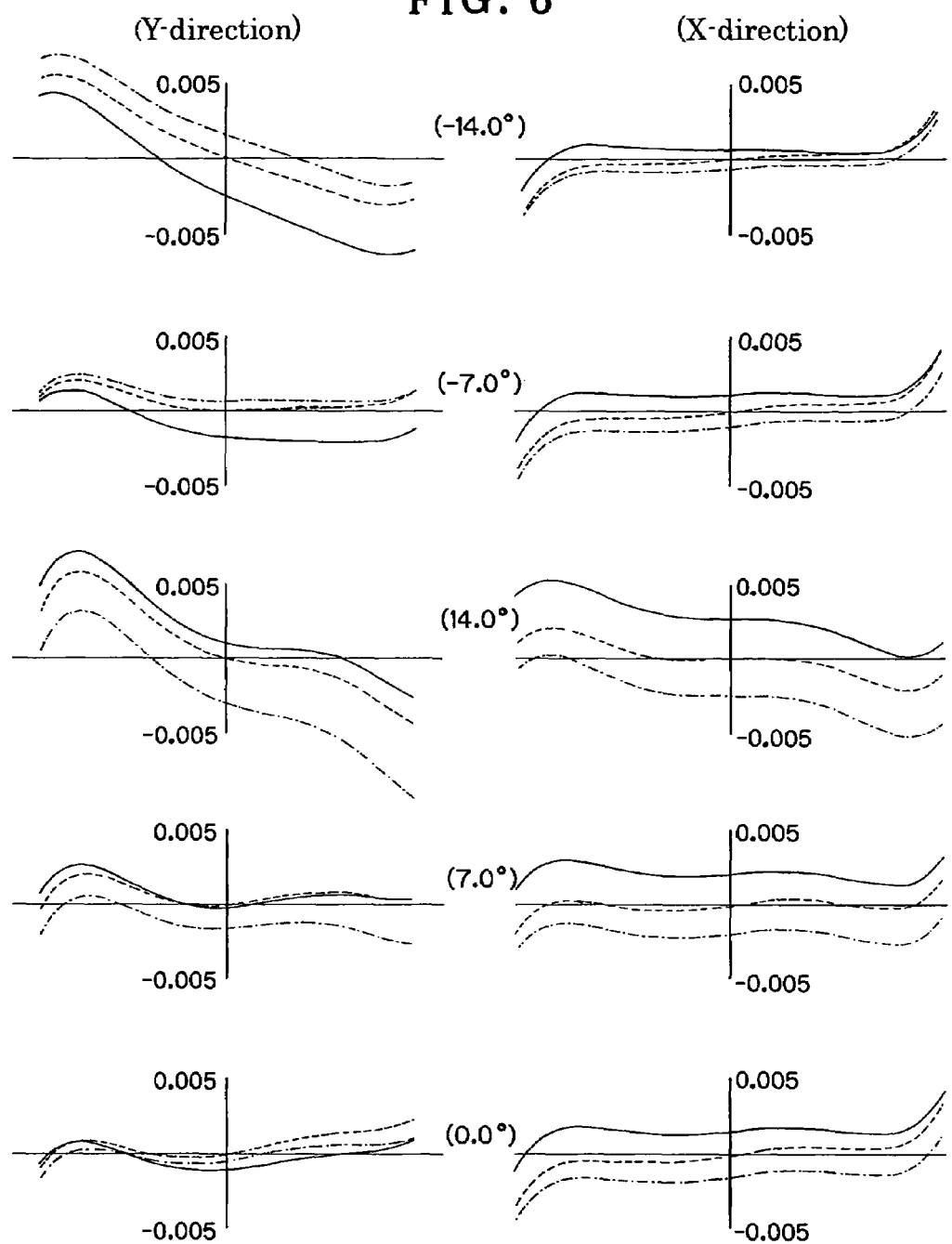
FIG. 6 is illustrative of transverse aberrations at an azimuth of 45° of the whole optical system according to Example 1.
Figure 7:
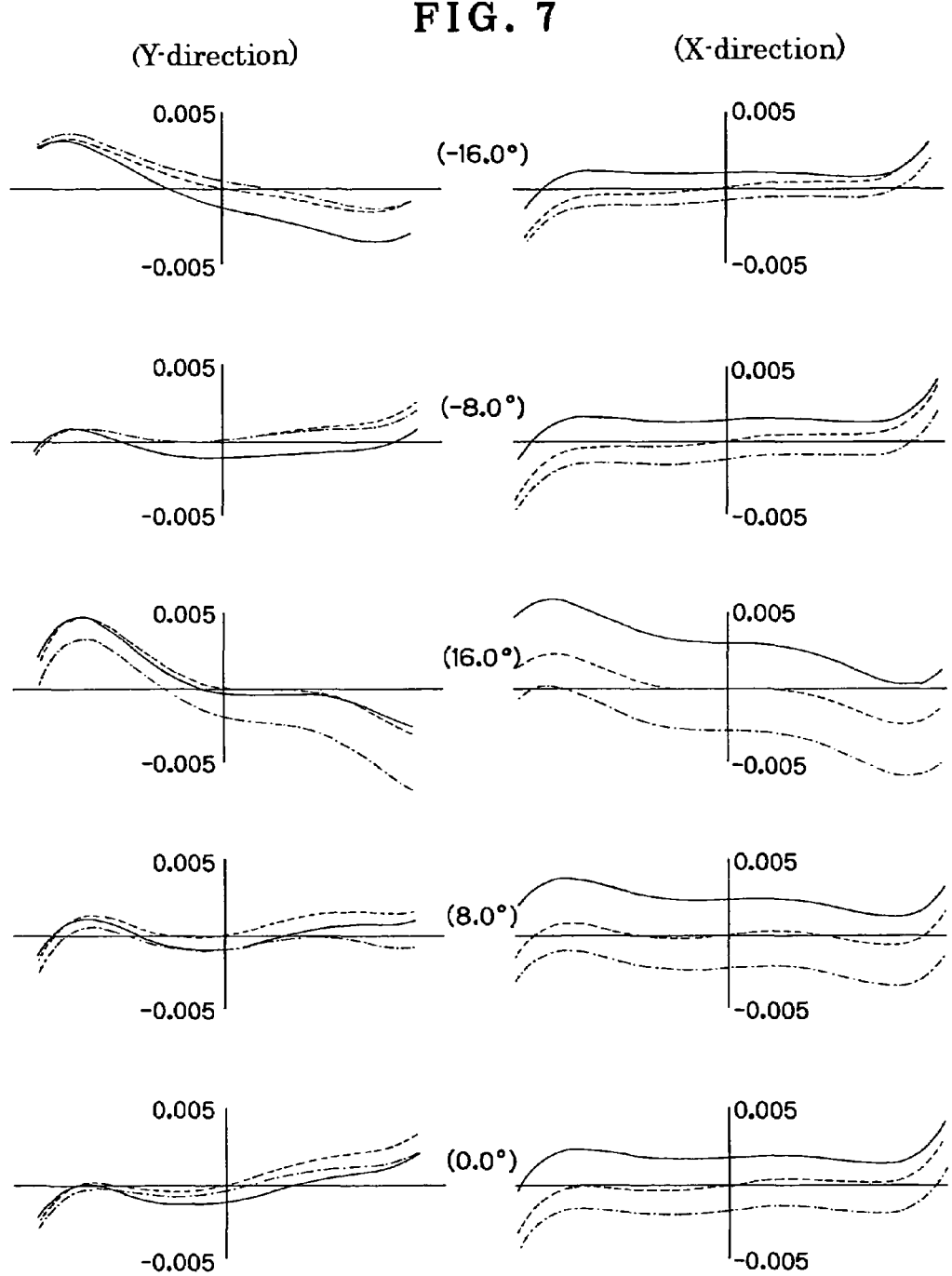
FIG. 7 is illustrative of transverse aberrations at an azimuth of 90° of the whole optical system according to Example 1.
Figure 8:
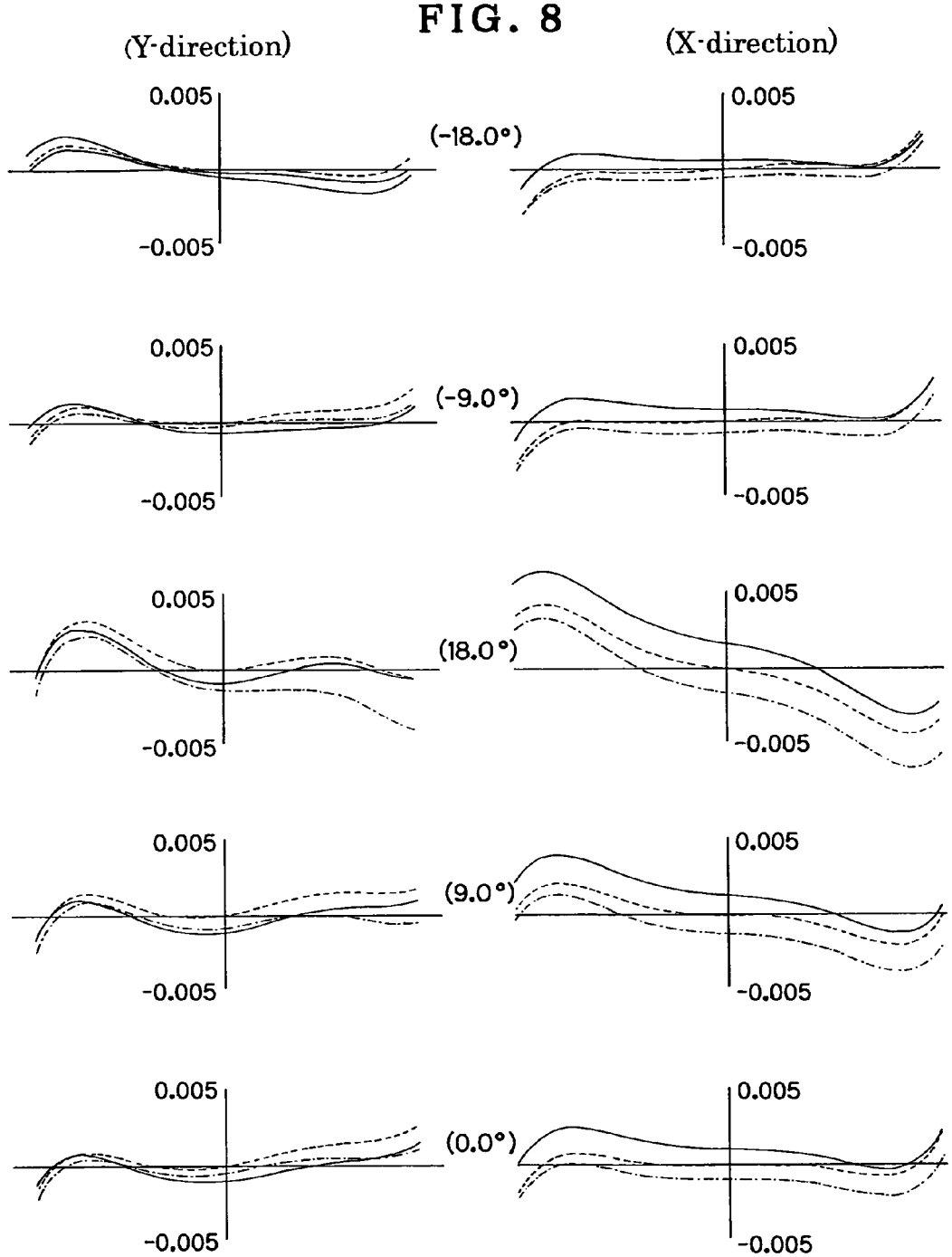
FIG. 8 is illustrative of transverse aberrations at an azimuth of 135° of the whole optical system according to Example 1.
Figure 9:
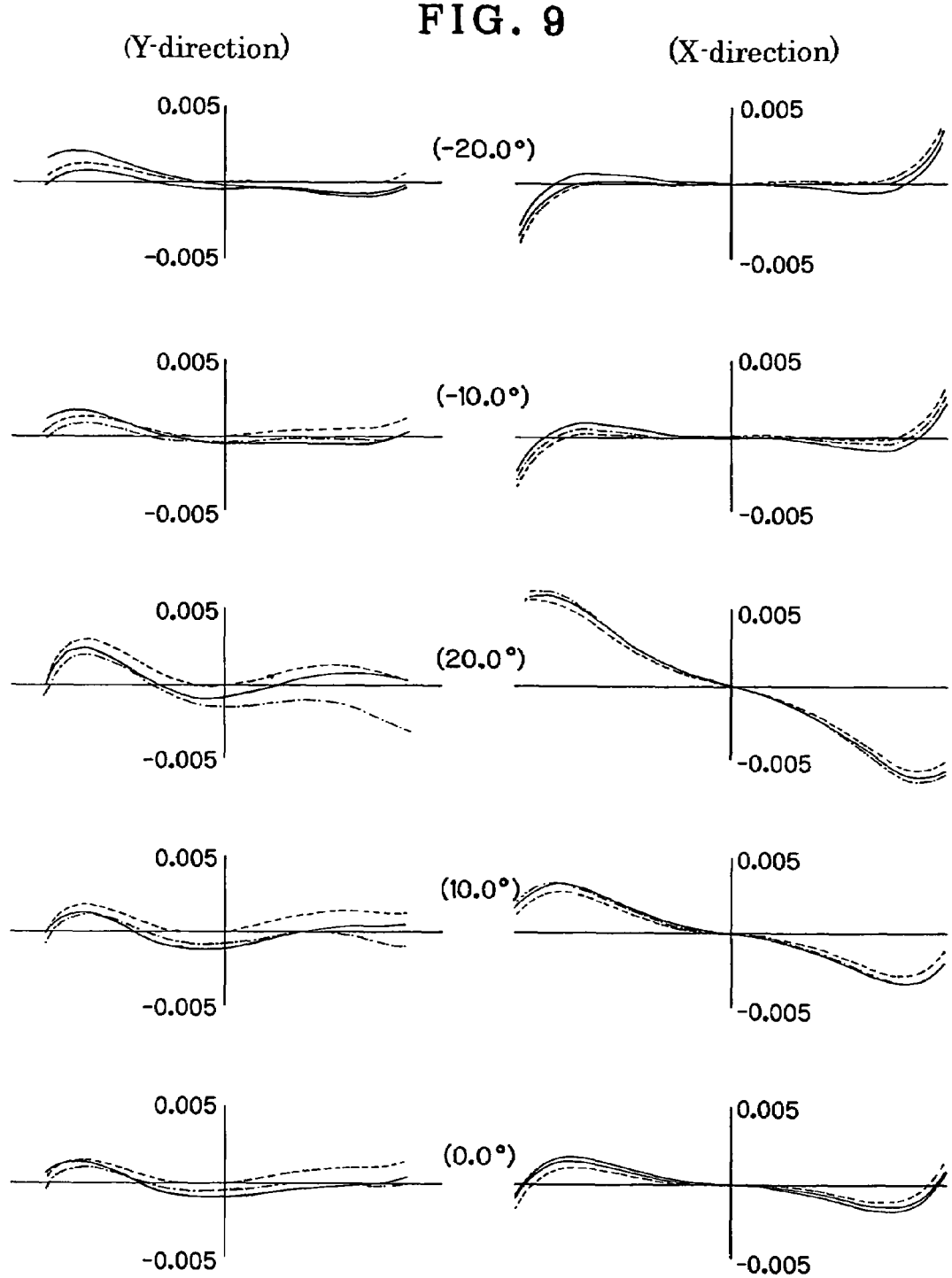
FIG. 9 is illustrative of transverse aberrations at an azimuth of 180° of the whole optical system according to Example 1.

FIG. 4 is a schematic representation of the magnification of the image formed on the image plane 30 in the optical system of Example 1, given later. The coordinate system is one for defining the image plane 30, in which the azimuths are indicated at angular intervals of 0°, 45°, 90°, 135°, 180°, 225°, 270°, 315° and 45° in the circumferential direction (sagittal distortion) of an annular image, and by lines in the radial direction (meridional distortion), which show that, about the horizontal direction (0°), the elevation angle is −10° and −20° with respect the center direction of the annular image and the depression angle is +10° and +20° in a direction away from the center of the annular image (signs positive and negative for the angle of view in the direction along the center axis 1 stand for the elevation angle and the depression angle, respectively). In actual applications, the angle of view in the direction along the center axis 1 is ±12° at 0° azimuth, ±14° at 45° and 315° azimuths, ±16° at 90° and 270° azimuths, ±18° at 135° and 225° azimuths, and ±20° at 180° azimuth. For a better understanding of distortions (magnification) in the sagittal and meridional directions, the angle of view is shown as enlarged to ±20°, save 180° azimuth.

From FIG. 4, it can be seen that, as depicted in FIGS. 1-3, the rotationally asymmetric optical element 60 differs in the shape of the meridional sections 61 and 62 depending on the azimuth direction and the sagittal section 61 takes a circle eccentric off the center axis 1 with a different angular magnification in both the meridional and sagittal directions, so that the magnification can be continuously varied in both the meridional and sagittal directions depending on the azimuth. From FIG. 4, it can also be seen that in the case of the optical system of Example 1 given later, the transverse magnification in both the sagittal and meridional directions becomes highest in the 0° azimuth direction, the transverse magnification in both the sagittal and meridional directions becomes lowest in the 180° azimuth direction, and the transverse magnification in both the sagittal and meridional directions becomes gradually low from the 0° to the 180° azimuth direction.

Alternatively, the shape of the meridional section of the rotationally asymmetric optical element 60 could be chosen in such a way as to make the angles of deflection of the center rays (chief rays) $3_0$, $3_{45}$, $3_{90}$, $3_{135}$, $3_{180}$, etc. in the direction along the center axis 1 different from one another, so that the angle-of-view direction in the meridional direction could be varied depending on the azimuth, as set forth in Example 7 given later.

By configuring the rotationally asymmetric optical element 60 as an optical element of rotationally asymmetric shape, it is thus possible to vary an image at any desired azimuth more largely than an image at other azimuth in terms of magnification and an angle-of-view direction.

Here, if at least one surface that forms the rotationally asymmetric optical element 60 is made up of a cylindrical surface, a toric surface, an extended rotation free-form surface (to be described later), and a free-form surface (smooth curve) having a freely variable shape depending on azimuths, each decentered off the center axis (rotationally symmetric axis) 1, it is possible to freely set the meridional and sagittal section shapes, and so it is possible for the first time to have a different magnification in the meridional section and the sagittal section or a different angle of deflection in the meridional direction.

Likewise, if the rotationally asymmetric optical element 60 is made up of a cylindrical surface, a toric surface, an extended rotating free-form surface (to be described later), and a free-form surface (smooth curve) having a freely variable shape depending on azimuth, each decentered off the center axis (rotationally symmetric axis) 1, it is possible to have a partially different image distortion (distortion) in the meridional section and the sagittal section.

Here, it is of much importance that the cylindrical form of rotationally asymmetric optical element 60 is located on the object side of the full-panoramic optical system 50, thereby enabling all full-direction light beams incident on the full-panoramic optical system 50 to enter the rotationally asymmetric optical element 60. It is thus possible for the first time to form a full-direction image with a different-magnification and at a different angle of deflection, yet without shading.

More importantly or more preferably, the rotationally asymmetric optical element 60 is substantially free from power changes due to azimuths. An increased power change causes a change in the image-formation position for light beams incident on the full-panoramic optical system 50 after passing through the rotationally asymmetric optical element 60, and as that change is large, there will be a huge resolution power drop.

Even more preferably, the rotationally asymmetric optical element 60 should satisfy the following conditions (1) and (2):

$$\Delta Pm < 0.1 (1/mm) \quad (1)$$

$$\Delta Ps < 0.1 (1/mm) \quad (2)$$

Where $\Delta Pm$ is a change of power due to azimuth of the rotationally asymmetric optical element 60 in the meridional section, and $\Delta Ps$ is a change of power due to azimuth of the rotationally asymmetric optical element 60 in the sagittal section.

As the respective upper limits of 0.1 (1/mm) to conditions (1) and (2) are exceeded, the rotationally asymmetric optical element 60 will have a substantially different power with respect to the meridional or sagittal section depending on azimuths. This will in turn cause a huge change due to azimuths in the object point position at the time of incidence of light on the full-panoramic optical system 50, resulting in a displacement of the image-formation position of the full-panoramic optical system 50 and, hence, a resolution drop.

Most preferably, $$\Delta Pm < 0.01 (1/mm) \quad (1-1)$$

$$\Delta Ps < 0.01 (1/mm) \quad (2-1)$$

Set out below are the values of $\Delta Pm$ and $\Delta Ps$ in Example 1 given later.

EXAMPLE 1

| | |
|---|---|
| $\Delta Pm$ | 0.00472 (1/mm) |
| $\Delta Ps$ | 0.00196 (1/mm) |

Next, when the rotationally asymmetric optical element 60 differs in angular magnification depending on an azimuth direction, it is important that the angular magnification changes depending on azimuths. As the angular magnification changes, it makes it possible to change the transverse magnification on the image plane. The angular magnification change may take place in the meridional section and/or in the sagittal section.

A more preferable approach to the generation of aberrations is to make the curvature of the meridional section of at least one surface of the rotationally asymmetric optical element 60 differ depending on azimuths, thereby changing the angular magnification across the meridional section. To keep the power change in a lot more check at the same time, it is also preferable to make the curvature of the meridional section of other surface of the rotationally asymmetric optical element 60 change on azimuths.

Further, if the meridional section of the rotationally asymmetric optical element 60 is configured such that it is concave on the side of the entrance pupil 6Y of the full-panoramic optical system 50, as in the embodiment of FIGS. 1-3, that is preferable because of a decrease in the amount of coma and astigmatism of the meridional section produced at the rotationally asymmetric optical element 60.

In the optical system of the invention, there is nothing critical except the requirement that the full-panoramic optical system 50 should have at least one reflecting surface 12 of rotationally symmetric shape that is rotationally symmetric about the center axis 1. For a better understanding of the invention, however, reference is now made to the full-panoramic optical system 50 as desired herein.

Specifically, the full-panoramic optical system 50 comprises a front unit 10 and a rear unit 20, each rotationally symmetric about the center axis 1, and a stop 5 interposed between them. The front unit 10 comprises at least one reflecting surface 12, 13, and the role of the front unit 10 is to convert light beams coming from an image, which travel from the full-panoramic direction toward the rotationally symmetric axis (center axis) 1, into an annular aerial image at an arbitrary position. The role of the rear unit 20 is to project that annular aerial image onto a plane that is the image plane 30.

And then, the full-panoramic optical system 50 gives independent curvatures to a line segment of any arbitrary shape of the meridional section and the sagittal section in a direction of rotation relative to the center axis 1, whereby the stop 5 located on the center axis 1 is back projected by the front unit 10, or it forms once an intermediate image to be back projected by the front unit 10, so that there is the entrance pupil 6Y formed within the meridional section. If the full-panoramic optical system 50 is set up such that only the entrance pupil 6Y within the meriodinal section is positioned near the first transmitting surface 11 of the front unit 10, it is then possible to cut off unnecessary light a lot more, which enters the front unit 10 of the full-panoramic optical system 50, and thus reduce flares.

On the other hand, because the full-panoramic optical system 50 takes on a rotationally symmetric system in the sagittal section orthogonal to the center axis 1, all the light beams $2_0$, $2_{45}$, $2_{90}$, $2_{135}$, $2_{180}$, etc. from different directions in the distance will always pass on the center axis 1 (FIG. 3) that is the center of rotation, and in the sagittal section, the light beams arriving at the annular image plane 30 will reach the image plane 30 after at least one passage on the center axis 1. In this way, the entrance pupil formed by back projection of the stop 5 will look as if it would lie on the center axis 1.

For a displacement of the entrance pupil position between in the meridional section and in the sagittal section, it is thus of importance that at least one reflecting surface 12, 13 of the full-panoramic optical system 50 is made up of a surface of rotationally symmetric shape that is formed by rotation about the center axis 1 of a line segment of any arbitrary shape including an odd-number degree term capable of gaining a free control of curvature in the meridional section and the sagittal section.

For the flare stop, just only a mechanically slit stop but also a casing designed for eye protection and a transparent pipe with an opaque portion painted black could be used. Alternatively, a reflection coating portion of the first reflecting surface or an optically unavailable area of the front unit 10 treated with sand or painted with a black paint 18 (FIGS. 1 and 2) could be used.

More preferably or more importantly, the entrance pupil 6Y of the meridional section of the full-panoramic optical system 50 should be projected onto the vicinity of the rotationally asymmetric optical element 60. This enables the flare stop for prevention of ghosts, etc. occurring at the full-panoramic optical system 50 to be effectively positioned. Further, it is possible to diminish the size of the surface of the rotationally asymmetric optical element 60 in the meridional direction, contributing to size reductions of the rotationally asymmetric optical element 60.

Example 1 of the optical system according to the invention is now explained; however, the constructional parameters of this optical system will be given later. The constructional parameters of Example 1 (and Example 7 given later) have been determined as a result of normal ray tracing from an object plane to the image plane 30 via the rotationally asymmetric optical element 60 and the full-panoramic optical system 50, as typically illustrated in FIG. 1.

When it comes to normal ray tracing as shown typically in FIG. 1, the origin of a decentered optical surface in a decentered optical system is defined by a position at which the entrance pupil 6Y is projected onto the rotationally symmetric axis (center axis) 1, the Y-axis positive direction is defined by a direction of the rotationally symmetric axis (center axis) 1 away from the image plane 30, and the Y-Z plane is defined by the paper plane of FIG. 1 (or the Z-axis positive direction is defined by an 180°-azimuth direction). Specifically, the Z-axis position direction is defined by a direction facing away from the side of the entrance pupil 6Y considered now in the paper of FIG. 1, and the X-axis positive direction is defined by an axis that forms with the Y- and Z-axes a right-handed orthogonal coordinate system.

For a decentered surface are the amount of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive signs for $\alpha$ and $\beta$ mean counterclockwise rotation with respect to the positive directions of the respective axes, and the positive sign for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a coaxial optical system, there is given a surface spacing. Besides, the radius of curvature of each surface and the refractive index and Abbe number of the medium are given according to common practices.

It is noted that the term with respect to aspheric surfaces on which no data are mentioned in the constructional parameters, given later, is zero. Refractive indices and Abbe numbers are given on a d-line (587.56 nm wavelength) basis, and length in mm. The decentration of each surface is given in terms of the amount of decentration from the position at which the entrance pupil 6Y is projected onto the image plane 30, as mentioned above.

In this conjunction, an aspheric surface is a rotationally symmetric aspheric surface given by the following defining formula:

$$Z=(Y^2/R)/[1+\{1-(1+k)Y^2/R^2\}^{1/2}]+aY^4+bY^6+cY^8+dY^{10}+ \quad \text{(a)}$$

Here, Z is an optical axis (axial chief ray) provided that the direction of propagation of light is taken as positive, Y is a direction vertical to that optical axis, R is a paraxial radius of curvature, k is a conical coefficient, and a, b, c, d are the fourth-, sixth-, eighth-, tenth-order aspheric coefficients, respectively. The Z-axis in this defining formula becomes the axis of the rotationally symmetric aspheric surface.

The extended rotation free-form surface is a rotationally symmetric surface given by the following definition.

First, there is given the following curve (b) passing on a Y-Z coordinate plane through its origin.

$$Z=(Y^2/RY)/[1+\{1-(C_1+1)Y^2/RY^2\}^{1/2}]C_2Y+C_3Y^2+ \\ C_4Y^3+C_5Y^4+C_6Y^5+C_7Y^6+\ldots+C_{21}Y^{20}+\ldots+ \\ C_{n+1}Y^n+\ldots \quad \text{(b)}$$

Then, there is given a curve F(Y) where the curve (b) is rotated by an angle $\theta$ (°) with left rotation defined as positive relative to the X-axis positive direction. This curve F(Y), too, passes on the Y-Z coordinate plane through the origin.

That curve F(Y) is parallel translated by a distance R in the Z-positive direction (in the Z-negative direction in the case of a negative sign), and the parallel translated curve is then rotated about the Y-axis. The thus obtained rotationally symmetric surface gives an extended rotation free-from surface.

As a consequence, the extended rotation free-form surface provides a free-form surface (smooth curve) in the Y-Z plane, and a circle with a radius |R| in the X-Z plane.

From this definition, the Y-axis becomes the axis of the extended rotation free-form surface.

Here, RY is the radius of curvature of a spherical term in the Y-Z section, $C_1$ is a conical constant, and $C_2$, $C_3$, $C_4$, $C_5$, . . . are the first-, second-, third- and fourth-order aspheric coefficients, respectively.

Desirously in the optical system of the invention, at least one reflecting surface of the full-panoramic optical system 50 should be such an extended rotation free-form surface that, when expressed by a polynomial in the Y-Z section, takes on a rotationally symmetric shape formed by rotation about the center axis 1 of a line segment of any arbitrary shape having at least an odd-number degree term yet having no symmetric surface. If such a surface shape is imparted to at least one reflecting surface, it is possible to provide an optical system whose resolving power is improved by correction of decentration aberrations unavoidable with a catoptric system, and diminish the size of that optical system.

FIG. 1 is illustrative in section of the optical system of Example 1, as taken along the center axis (rotationally symmetric axis) 1 of the full-panoramic optical system 50 and including a center ray (chief ray) $3_0$ from a 0°-azimuth direction and a center ray (chief ray) $3_{180}$ from an 180°-azimuth direction, and FIG. 2 is illustrative in section of Example 1, as taken along the center axis (rotationally symmetric axis) 1 and including a center ray (chief ray) $3_{90}$ from a 90°-azimuth direction. FIG. 3 is a plan view of an optical path upon projection onto the X-Z plane orthogonal to the center axis (rotationally symmetric axis) 1 of that optical system. In FIG. 3, note that only center light beams $2_0$, $2_{45}$, $2_{90}$, $2_{135}$ and $2_{180}$ from directions having azimuths of 0°, 45°, 90°, 135° and 180°, respectively, are indicated, and that to make mutual distinctions between light beams and center rays from the respective directions, the azimuths belonging to them are indicated by numerical subscripts.

The optical system of this example comprises a full-panoramic optical system 50 comprising a front unit 10 rotationally symmetric about the center axis 1, a rear unit 20 rotationally symmetric about the center axis 1 and an aperture 5 interposed between the front unit 10 and the rear unit 20 and coaxially with the center axis 1, and a cylindrical form of rotationally asymmetric optical element 60 located in such a way as to surround the full circumference of the entrance surface 11 of that full-panoramic optical system 50. Here, when the center axis 1 is taken as perpendicular, light beams $2_0$, $2_{45}$, $2_{90}$, $2_{135}$, $1_{180}$, $4U_0$, $4U_{45}$, $4U_{90}$, $4U_{135}$, $4U_{180}$, $4L_0$, $4L_{45}$, $4L_{90}$, $4L_{135}$, $4L_{180}$, etc. (for instance, the light beam $4L_0$ is the one incident from the sky side in the distance and the light beam 4L0 is the one incident from the ground side in the distance, with an image plane 30 directed to the zenith) pass through the first surface 61 and the second surface 62 of the rotationally asymmetric optical element 60 made up of a transparent medium having a refractive index greater than 1 and enter the transparent medium of the front unit 10 via the first transmitting surface 11 of the front unit 10 in the full-panoramic optical system 50. Then, the beams cross the center axis 1, and are reflected upward at the internal reflecting surface 12 opposite to the transmitting surface 11 in such a way to go away from the rear unit 20. Then, the beams are again reflected toward the rear unit 20 at an internal reflecting surface 13 positioned on the same side as the internal reflecting surface 12 and further away from the rear unit 20, leaving the transparent medium of the front unit 10 via a transmitting surface 14 that is an exit surface. Finally, the beams enter the rear unit 20 via the aperture 5, forming images of objects in the respective azimuth directions at a radially given position of the image plane 30 off the center axis 1.

In the optical system of this example, the light beam $2_0$ or the like coming from the objects in the distance forms an intermediate image once at a position between the first transmitting surface 11 and the first reflecting surface 12 but nearer to the first reflecting surface 12 in the section including the center axis 1 (FIG. 1), and at a position between the first reflecting surface 12 and the second reflecting surface 13 in a plane that is orthogonal to the plane including the center axis 1 and including the center ray of that light beam (FIG. 3).

With the center axis 1 set perpendicularly (vertically), this optical system is operable to form on the image plane 30 an image that, for instance, has a full 360°-direction (full-panoramic) angle of view, and that is in such an annular form that the zenith direction is toward the center of the image and the ground direction takes on an outer circle.

The rotationally asymmetric optical element 60 is made up of a cylindrical form of transparent medium having a refractive index greater than 1, and comprises an outer, first surface 61 of rotational asymmetry and a second surface 62 that is rotationally symmetric about the center axis 1. Here, the second surface 62 comprises an extended rotation free-form surface while the first surface 61 comprises a rotationally asymmetric surface that is defined by smoothly connecting together extended rotation free-form surfaces rotating about the same decentration position and having a different shape per azimuth. While, in the constructional parameters of Example 1 given later, this surface 61, too, is indicated as the extended rotation free-form surface, it is to be understood that in point of fact, it is such a rotation asymmetric surface.

The front unit 10 of the full-panoramic optical system 50 is formed of a resin or other transparent medium that is rotationally symmetric about the center axis 1 and has a refracting index greater than 1, and has two internal reflecting surfaces 12, 13 and two transmitting surfaces 11, 14. The internal reflecting surfaces 12, 13 and the transmitting surfaces 11, 14, too, are each in a shape rotationally symmetric about the center axis 1. The rear unit 10 comprises a three-unit lens system including five lenses L1 to L5, each being rotationally symmetric about the center axis 1 and having positive power.

And then, the transparent medium of the front unit 10 comprises a first transmitting surface 11 on which light beams $2_0$, $2_{45}$, $2_{90}$, $2_{135}$, $2_{180}$, etc. are incident via the rotationally asymmetric optical element 60, a first reflecting surface 12 which faces away from the first transmitting surface 11 with the center axis 1 between them and on which light beams coming from the first transmitting surface 11 are incident, a second reflecting surface 13 which is positioned on the same side as the first reflecting surface 12 and on which light beams reflected at the first reflecting surface 12 are incident, and a second transmitting surface 14 which faces the rear unit 20 and on which light beams reflected at the second reflecting surface 13 are incident, wherein the first transmitting surface 11, the first reflecting surface 12 and the second reflecting surface 13 each comprise an extended rotation free-form surface. Note however that both the conical constant and the aspheric coefficient are zero, and the second transmitting surface 14 comprises an aspheric surface rotationally symmetric about the center axis 1.

The lens system that forms the rear unit 20 comprises, in order from the front unit 10 side, a positive meniscus lens L1 concave on its front unit 10 side, a cemented lens consisting of a positive meniscus lens L2 concave on its front unit 10 side and a negative meniscus lens L3 concave on its front unit 10 side, and a cemented lens consisting of a double-convex positive lens L4 and a double-concave negative lens L5.

The specifications of Example 1 are:
Horizontal angle of view: 360°,
Vertical angle of view: 24°(0° azimuth) to 40° (180° azimuth),
Entrance pupil diameter: 0.86 mm (0° azimuth) to 1.44 mm (180° azimuth), and
Image size: φ2.07 mm to φ5.92 mm (0° azimuth).

FIG. 4 is a schematic representation of the magnification of the image formed on the image plane 30 in this example. What is meant by FIG. 4 has already been explained.

FIGS. 5, 6, 7, 8 and 9 are transverse aberration diagrams for the whole optical system of this example at azimuths of 0°, 45°, 90°, 135° and 180°, respectively. In these aberration diagrams, the angle at the center is indicative of the angle of view in the perpendicular (sagittal) direction, and Y (meridional)-direction and X (sagittal)-direction transverse aberrations at that angle of view. Throughout the disclosure, the positive and negative signs for the angle of view are indicative of a depression angle and an elevation angle, respectively.

Figure 10:
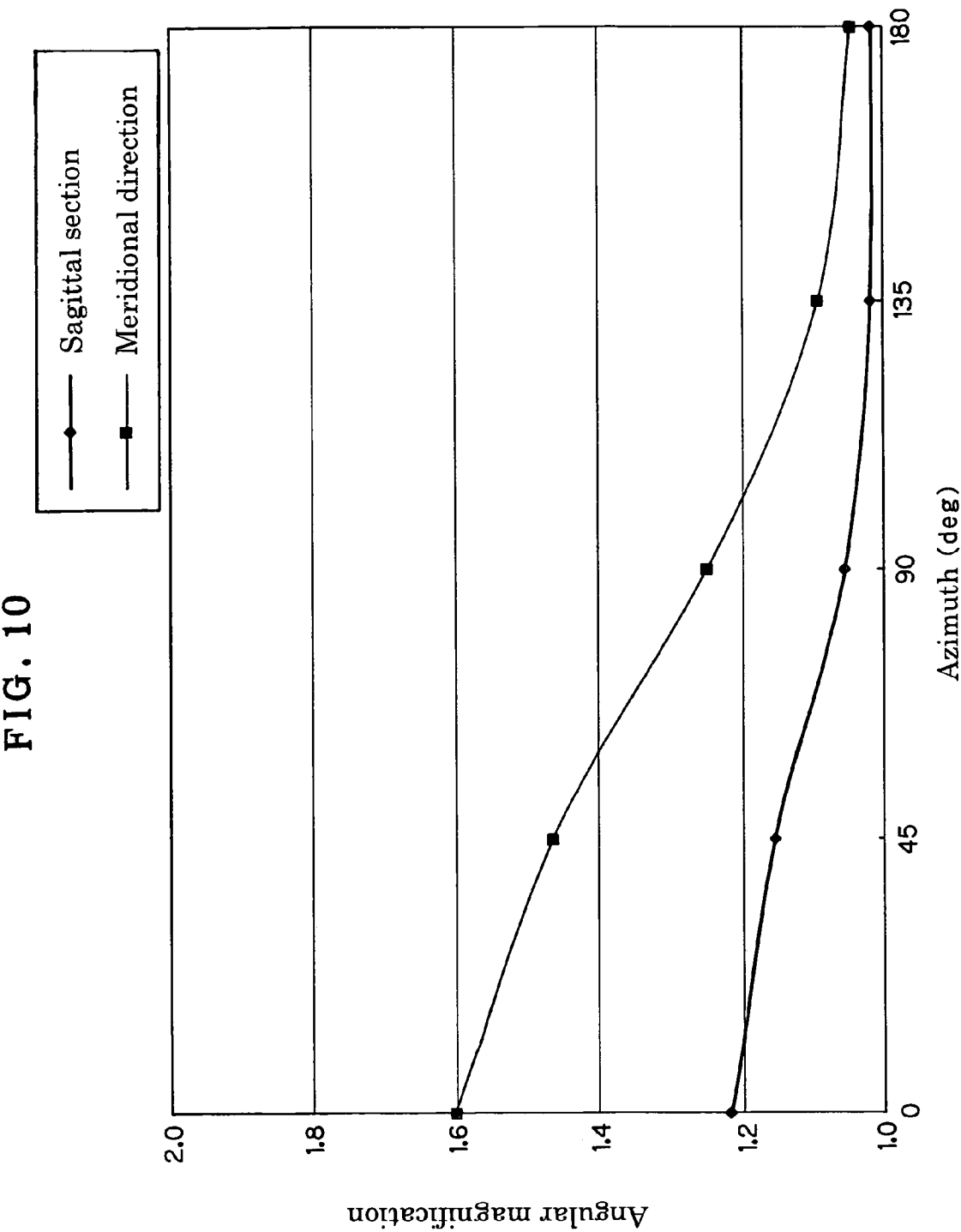
FIG. 10 is illustrative of changes in angular magnifications in the sagittal and meridional sections, respectively, due to the azimuth of the rotationally asymmetric optical system according to Example 1.

FIG. 10 is illustrative of angular magnification changes in the sagittal and meridional sections due to the azimuth of the rotationally asymmetric optical element 60 according to this example.

Figure 11:
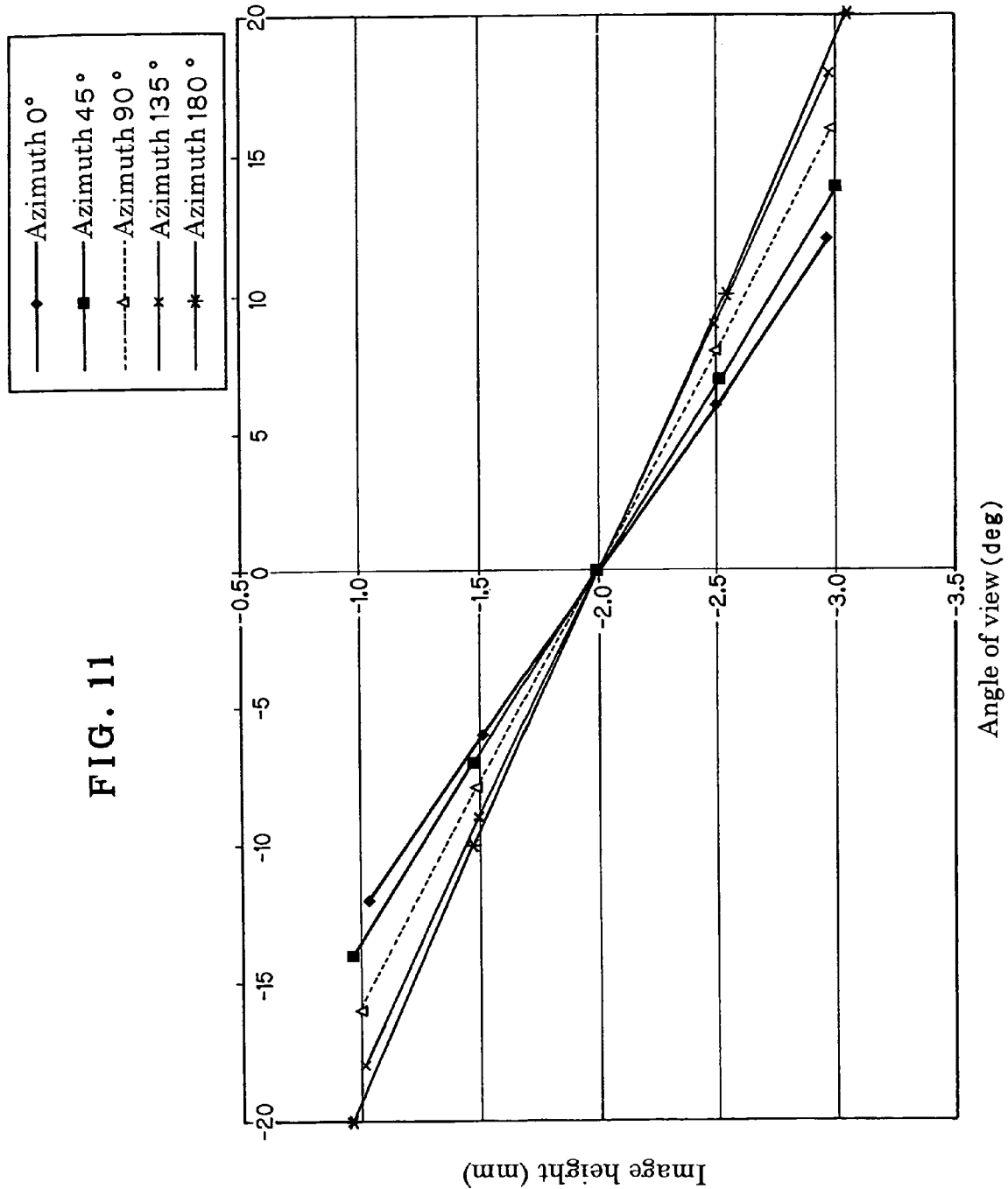
FIG. 11 is illustrative of the meridional distortion of the whole optical system according to Example 1.

FIG. 11 is indicative of meridional distortion. The angle of view in the meridional section is ±12° at an azimuth of 0°, ±14° at an azimuth of 45°, ±16° at an azimuth of 90°, ±18° at an azimuth of 135°, and ±20° at an azimuth of 180°. In this connection, sagittal distortion can be seen from FIG. 4.

The first feature of Example 1 is that the rotationally symmetric axis of the first transmitting surface 61 of the rotationally asymmetric optical element 60 comprising two surfaces is displaced to a position of decentration (1) that is displaced −6 mm in the Z direction from the rotationally symmetric axis 1 of the full-panoramic optical system 50 that is the perpendicular to the center of the image plane (6 mm in the 0°-azimuth direction) (FIG. 3). This causes the angle of view in the sagittal direction to differ depending on azimuths, so that a horizontal image in the 0° azimuth direction (the Z-axis minus direction) is enlarged and formed in the sagittal (horizontal) direction.

The second feature of Example 1 is that with azimuth changes from 0° toward 180°, the curvature of the meridional section of the first transmitting surface 61 of the rotationally asymmetric optical element 60 comprising two surfaces changes from 11.80 mm to 8.04 mm. In this example, the surface spacing between the first transmitting surface 61 and the second transmitting surface 62 of the rotationally asymmetric optical element 60 takes a primary part in magnification changes in the meridional section (the surface spacing is 25.0+6−18=13 mm at an azimuth of 0°, and 25.0−6−18=1 mm at an azimuth of 180°). However, if the curvature of the first transmitting surface 61 or the second transmitting surface 62 is changed depending on azimuths as desired, it is then possible to take up focal position fluctuations, thereby getting hold of good aberration performance at every azimuth.

Figure 12A:
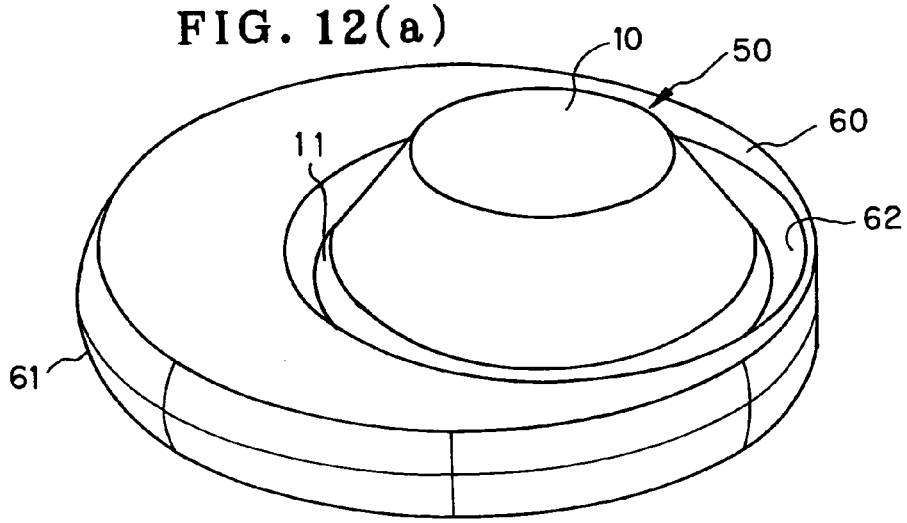
FIG. 12 is illustrative in schematic perspective of the rotationally asymmetric optical system according to Example 2.
Figure 12B:
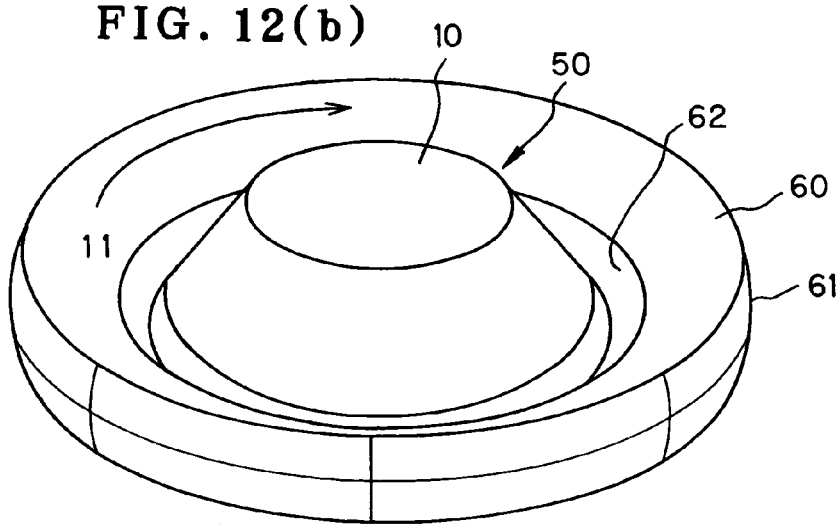
Figure 12C:
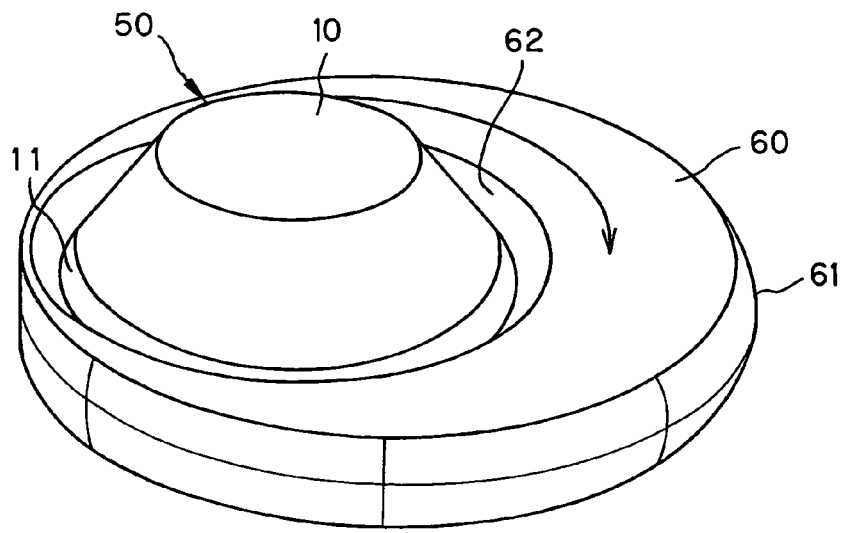

Example 2 is now explained with reference to FIG. 12. FIGS. 12(a), 12(b) and 12(c) are illustrative in schematic section of the optical system of Example 2. As in Example 1, this example comprises a full-panoramic optical system 50 rotationally symmetric about a center axis 1, and a cylindrical form of rotationally asymmetric optical element 60 located in such a way as to surround the full circumference of the entrance surface 11 of the full-panoramic optical system 50. In this example, the rotationally symmetric optical element 60 differs continuously in the shapes of both the meridional and sagittal sections to form on an image plane 30 (FIG. 1) a full-panoramic image with its transverse magnification differing continuously in both the meridional and sagittal directions depending on azimuths. For instance, assume that the optical system of FIG. 12(a) is in the state of FIG. 1 (where there is the highest transverse magnification ever in the 0°-azimuth direction and the lowest transverse magnification ever in the 180°-azimuth direction). Here, if the rotationally asymmetric optical element 60 is successively rotated about the rotationally symmetric axis 1 of the full-panoramic optical system 50 (FIG. 1) as depicted in FIGS. 12(b) and 12(c), an object at a specific azimuth can be viewed with a successively varying magnifying factor or that image can be projected onto a specific azimuth direction with a successively varying magnifying factor. For instance, at an azimuth of 0°, the magnification becomes highest in the state of FIG. 12(a), and medium in the state of FIG. 12(b). In the state of FIG. 12(c) where the rotationally asymmetric optical element 60 is rotated 180°, the magnification becomes lowest.

Of course in the case of an image-formation optical system, it is necessary to correct the annular image formed on the image plane 30 for distortion. When a full-panoramic image is shown and projected as an annular image on the image plane 30, a previously distorted image must be electronically created in consideration of the angular magnification of the rotationally asymmetric optical system 60.

Figure 13A:
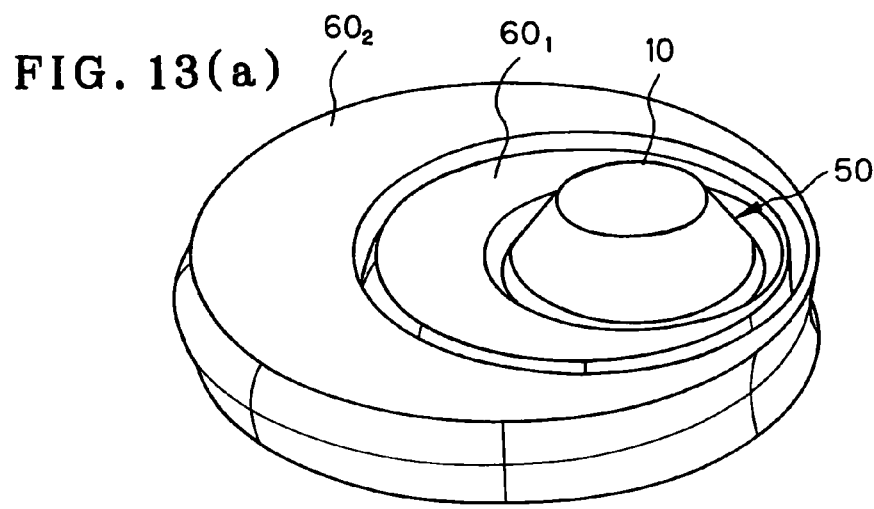
FIG. 13 is illustrative in schematic perspective of the rotationally asymmetric optical system according to Example 3.
Figure 13B:
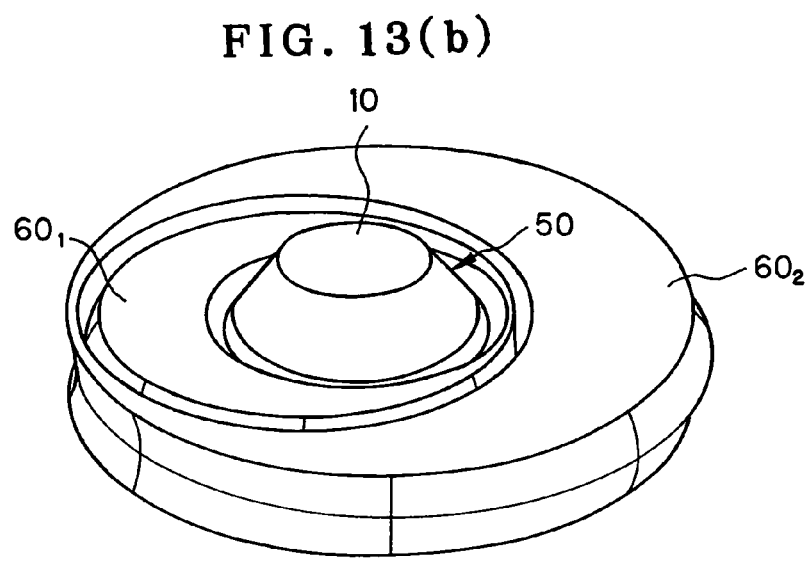
Figure 13C:
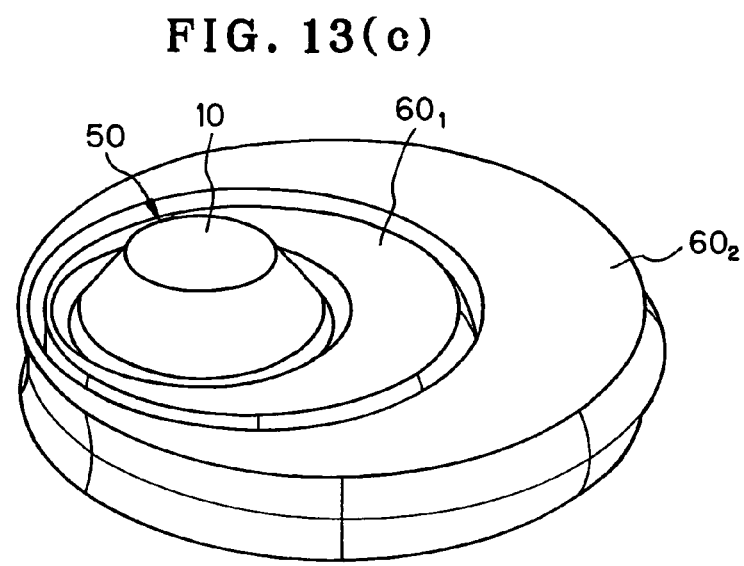

Example 3 is explained with reference to FIG. 13 similar to FIG. 12. This example is a modification to Example 2, wherein two rotationally asymmetric optical elements $60_1$ and $60_2$ are concentrically located. The outer, rotationally asymmetric optical element 602 is located in such a way as to rotate around the inner, rotationally asymmetric optical element $60_1$ and about an axis parallel with the center axis 1, and the inner, rotationally asymmetric optical element $60_1$ is designed to be independently rotatable about the center axis 1 as in Example 2, so that higher magnification ratios are achievable. For instance, when the angular magnifications of the two rotationally asymmetric optical elements $60_1$ and $60_2$ at azimuths of 0° and 180° are set at 22× and 0.5×, magnifications of 4× and of 0.25× are achievable in the 0°- and 180°-azimuth directions, respectively, in the case of FIG. 13(a), which means a magnification ratio of 8. In the case of FIG. 13(b), an angular magnification of 1× is obtainable in every direction regardless of azimuth. In FIG. 13(b) in sharp contrast to FIG. 13(a), magnifications of 4× and 0.25× are obtainable at the 180°- and 0°-azimuth directions, respectively, which means a magnification ratio of 8 (1/8).

Figure 14A:
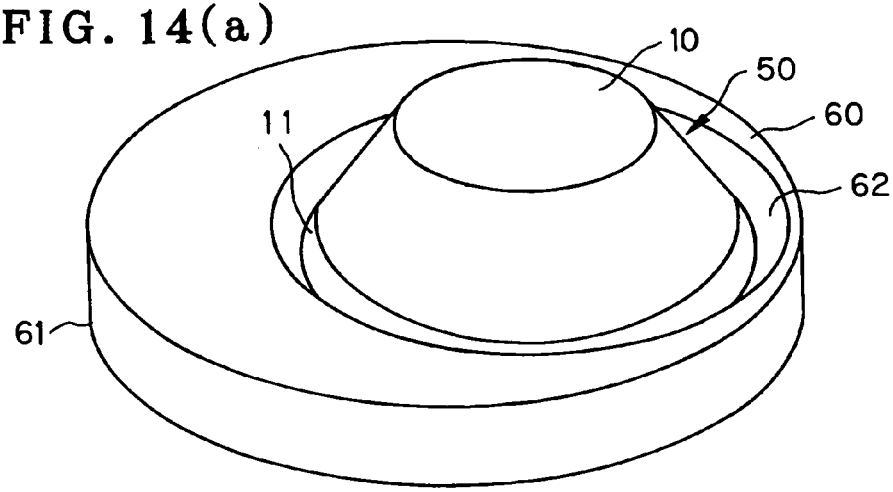
FIG. 14 is illustrative in schematic perspective of the rotationally asymmetric optical system according to Example 4.
Figure 14B:
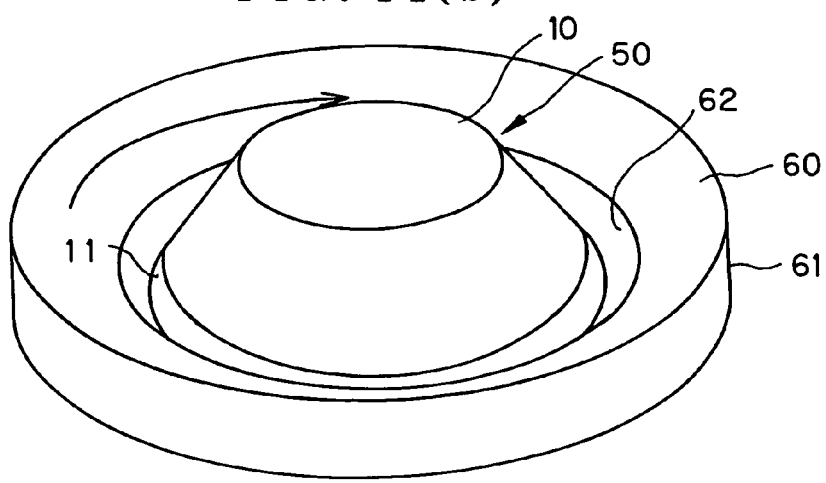
Figure 14C:
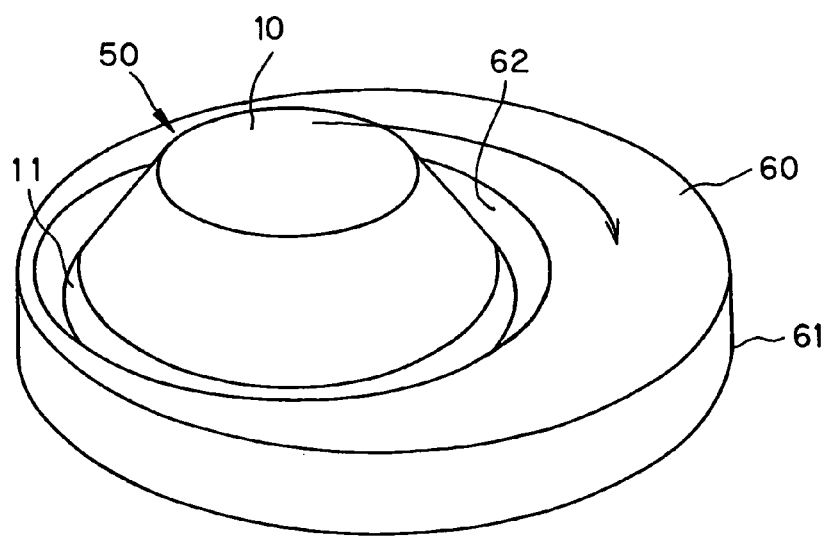

Example 4 is explained with reference to FIG. 14 similar to FIG. 12. This example is a modification to Example 2, wherein a rotationally asymmetric optical element 60 differs continuously in the shape of the sagittal section alone in an azimuth direction to form on the image plane 30 (FIG. 1) a full-panoramic image with its transverse magnification differing continuously in the sagittal direction alone depending on azimuths. In this example, too, the rotationally asymmetric optical element 60 is fixed as in Example 2 and as depicted in FIG. 14(a), so that a maximum magnification is obtainable at a specific azimuth while a minimum magnification is attainable at another azimuth. Alternatively, with the rotationally asymmetric optical element 60 successively rotated about the rotationally symmetric axis 1 (FIG. 1) of the full-panoramic optical system 50 as depicted in FIGS. 14(b) and 14(c), an object at a specific azimuth could be viewed with a successively varying magnifying factor or an image of that object could be projected with a successively varying magnifying factor in a specific azimuth direction. In this case, there is no magnification change in the meridional section; therefore, the curvature in the meridional section of the first transmitting surface 61 and the second transmitting surface 62 of the rotationally asymmetric optical element 60 is zero.

Figure 15A:
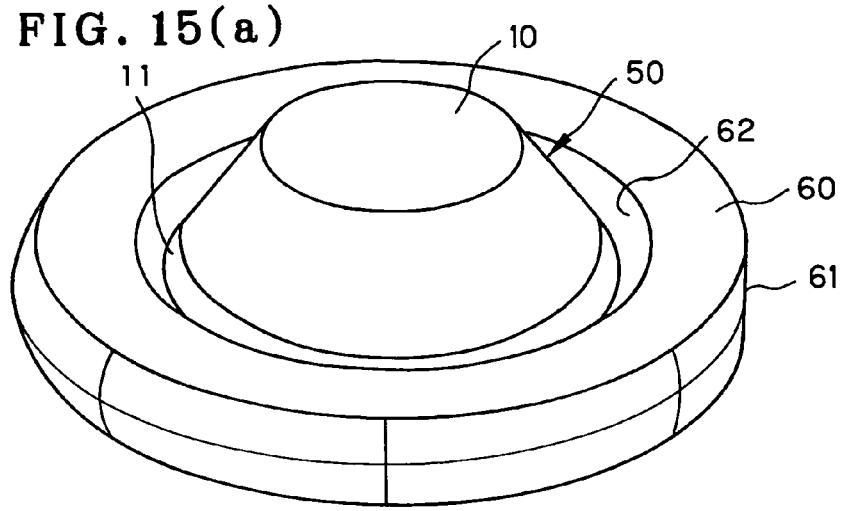
FIG. 15 is illustrative in schematic perspective of the rotationally asymmetric optical system according to Example 5.
Figure 15B:
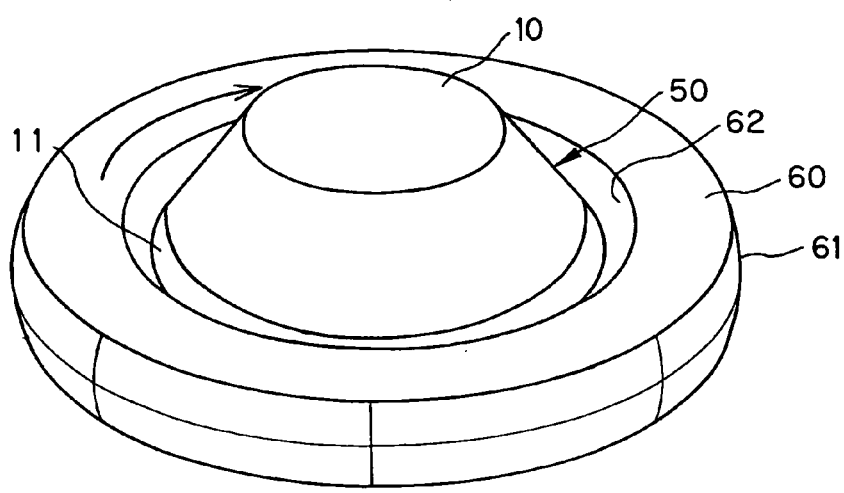
Figure 15C:
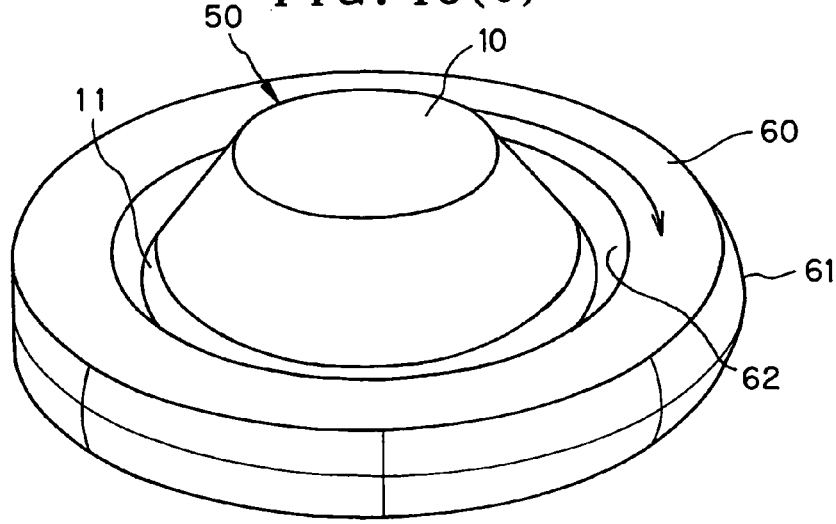

Example 5 is explained with reference to FIG. 15 similar to FIG. 12. This example is a modification to Example 2, wherein a rotationally asymmetric optical element 60 differs continuously in the meridional section alone in an azimuth direction to form on the image plane 30 (FIG. 1) a full-panoramic image with its transverse magnification differing continuously in the meridional direction alone depending on azimuths. In this example, the transverse magnification of the image in the meridional direction is continuously varied by allowing the radius of curvature in the meridional section of the first transmitting surface 61 of the rotationally asymmetric optical element 60 to differ depending on azimuths. In this example, too, the rotationally asymmetric optical element 60 is fixed as in Example 2 and as depicted in FIG. 15(a), so that a maximum magnification is obtainable at a specific azimuth while a minimum magnification is attainable at another azimuth. Alternatively, with the rotationally asymmetric optical element 60 successively rotated about the rotationally symmetric axis 1 (FIG. 1) of the full-panoramic optical system 50 as depicted in FIGS. 15(b) and 15(c), an object at a specific azimuth could be viewed with a successively varying magnifying factor or an image of that object could be projected with a successively varying magnifying factor in a specific azimuth direction.

With Example 1, it is possible to gain magnification ratios although there is a decreased curvature change in the meridional section, because there is a change in the surface spacing between the first transmitting surface 61 and the second transmitting surface 62 of the rotationally asymmetric optical element 60. Yet, there is a need of making an outer casing for protection of the optical system relatively large, because the outer periphery of the optical system changes on the rotation of the rotationally asymmetric optical element 60. With this example, however, there is a merit that by virtue of no change in the surface spacing between the two transmitting surfaces 61 and 62 of the rotationally asymmetric optical element 60, the optical system including its protective casing can be slimmed down in spite of the rotation of the rotationally asymmetric optical element 60.

Figure 16A:
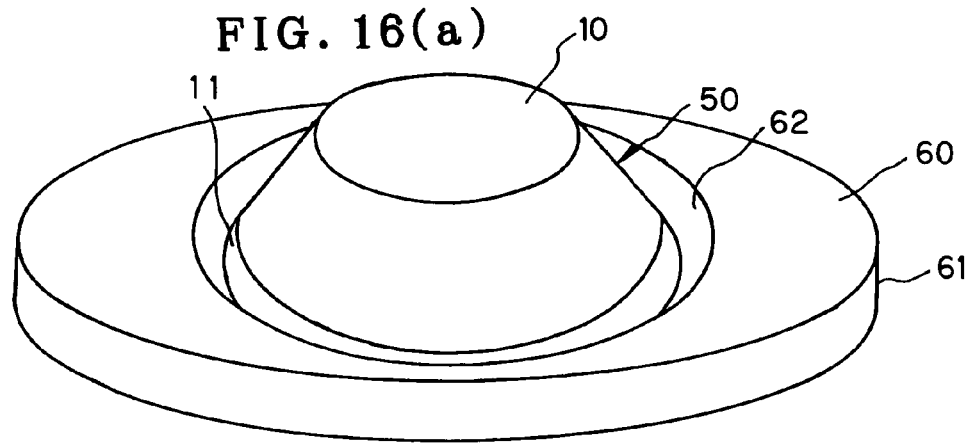
FIG. 16 is illustrative in schematic perspective of the rotationally asymmetric optical system according to Example 6.

Example 6 is explained with reference to FIG. 16 similar to FIG. 12. This example is a modification to Example 4. In Example 4, the first transmitting surface 61 of the rotationally asymmetric optical element 60 in a circular form with a decentered center of rotation while the second transmitting surface 62 is in a circular form coaxial with the rotationally symmetric axis 1 of the full-panoramic optical system 50. However, if the first transmitting surface 61 is configured into an elliptic shape rather than into a circular shape, as shown in FIG. 16(a), thereby intentionally varying the curvature of the sagittal section, it is then possible to make the magnification ratio larger. More preferably in this case, the second transmitting surface 62, too, should be configured into an elliptic shape so as to minimize the then focal position changes.

Of course in this example, curvature changes due to azimuths could be applied to the shape of the meridional section of the first transmitting surface 61, and the second transmitting surface 62 of the rotationally asymmetric optical element 60.

It is particularly preferable to use this example in the form of a car's supervisory device or the like, because of an enhanced resolving power on watching ahead and back.

Figure 16B:
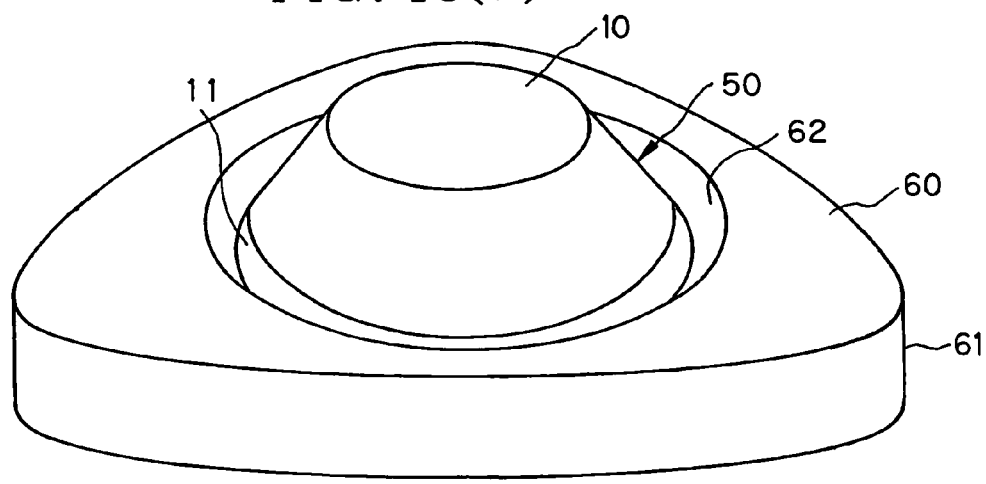
Figure 16C:
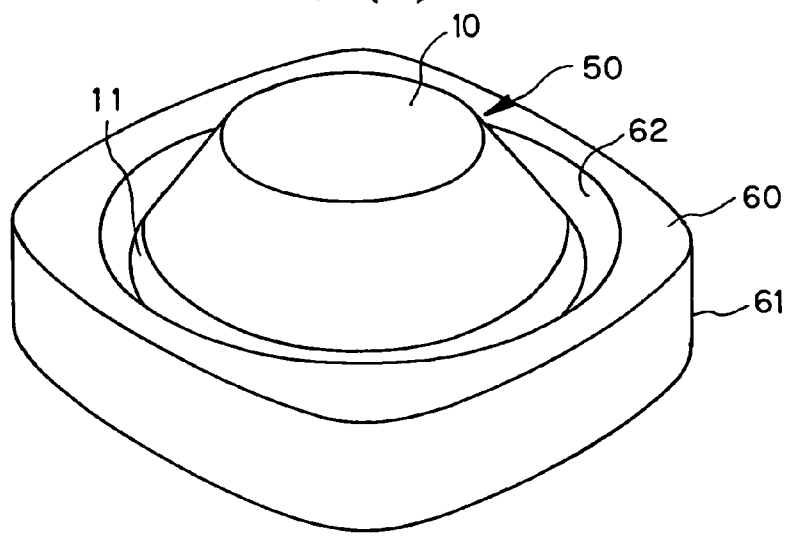

Further, the first transmitting surface 61 (and also the second transmitting surface 62, if required) of the rotationally asymmetric optical element 60 could be configured into a triangular (with rounded vertexes) or rectangular shape rather than into a circular or elliptical shape, as depicted in FIGS. 16(b) and 16(c).

Figure 17:
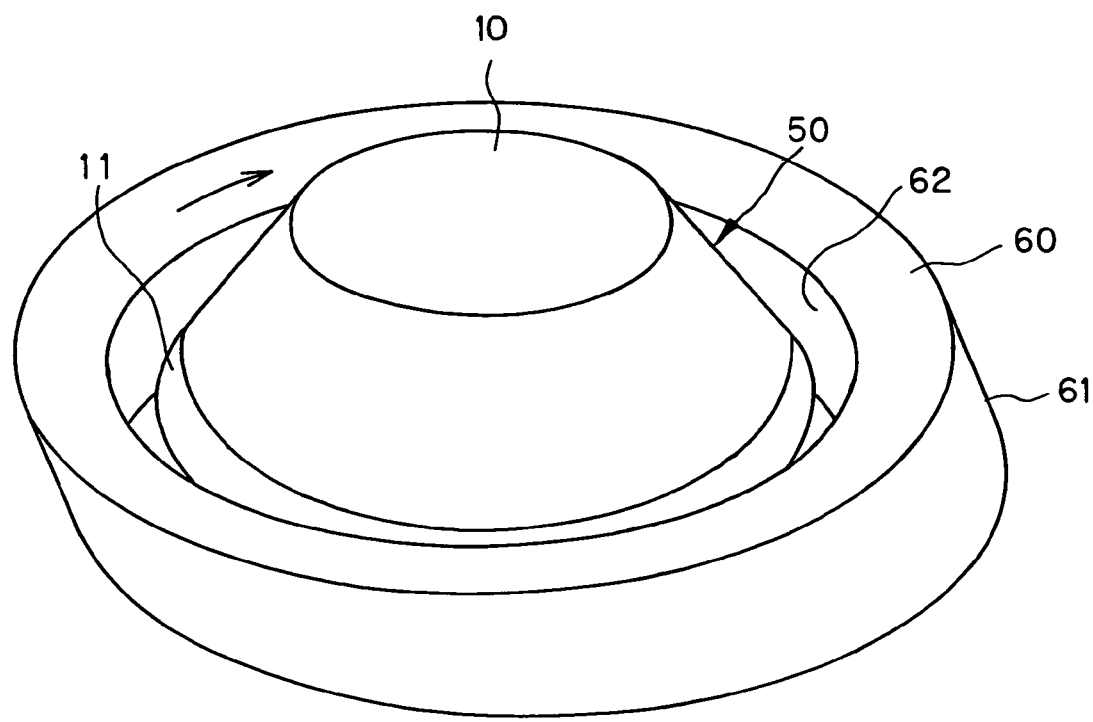
FIG. 17 is illustrative in schematic perspective of the rotationally asymmetric optical system according to Example 7.
Figure 18:
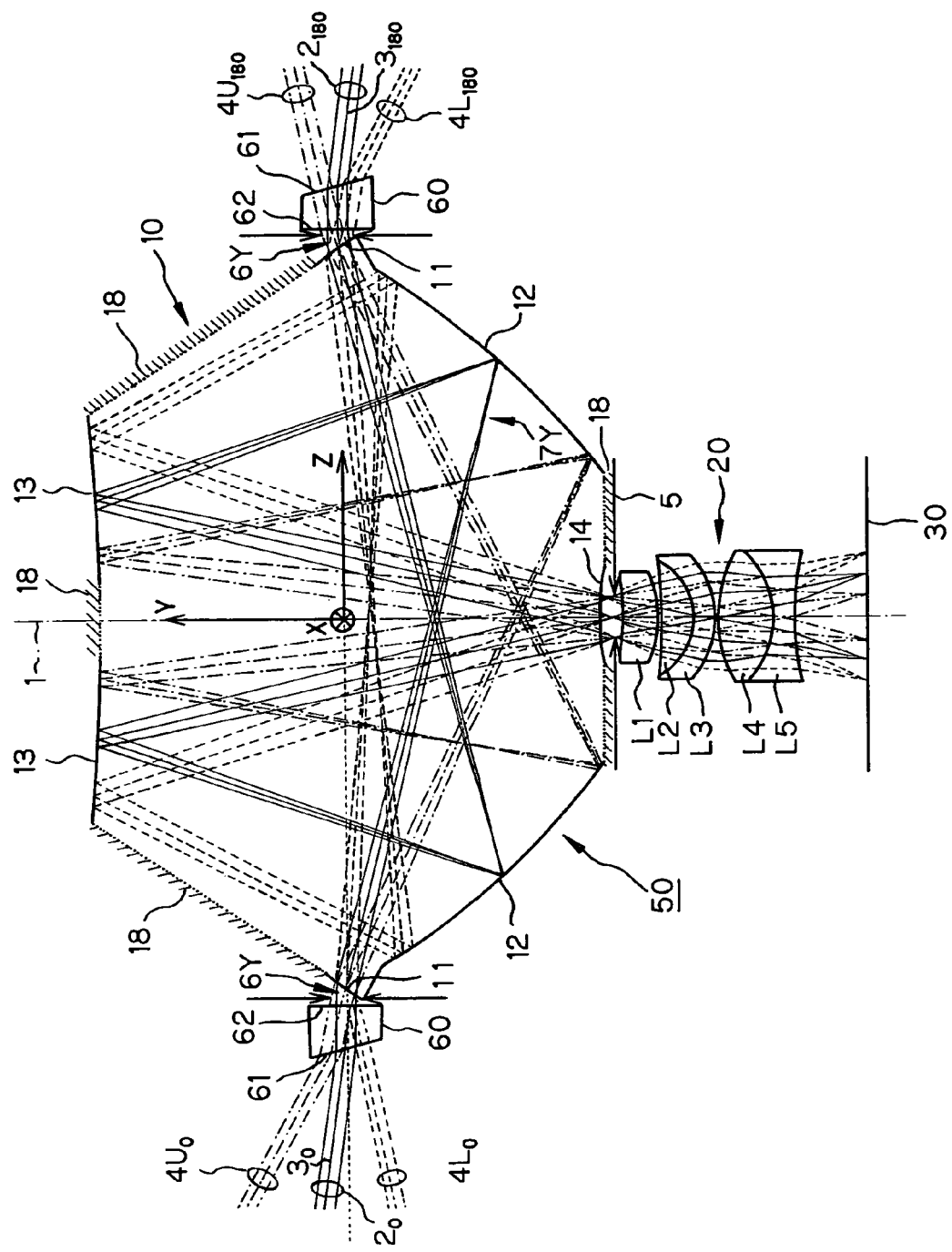
FIG. 18 is illustrative in section, as in FIG. 1, of the rotationally asymmetric optical system according to Example 7.

Example 7 is now explained with reference to FIGS. 17 and 18. FIG. 17 is illustrative in schematic perspective of the optical system of Example 7, and FIG. 18 is illustrative in section, as in FIG. 1, of the optical system of Example 7, as taken along the center axis (rotationally symmetric axis) 1 of a full-panoramic optical system 50, and including a center ray (chief ray) $3_0$ from a 0°-azimuth direction and a center ray (chief ray) $3_{180}$ from an 180°-azimuth direction.

In this example, the full-panoramic optical system 50 is quite the same as that in Example 1, and so is not explained any more. And then, a rotationally asymmetric optical element 60 located in such a way as to surround the full circumference of the entrance surface 11 of the full-panoramic optical system 50 changes continuously in the angle of deflection in the meridional direction depending on azimuths. To this end, the first transmitting surface 61 of the rotationally asymmetric optical element 60 has a tilt to the center axis (rotationally symmetric axis) 1, as can be seen from FIGS. 17 and 18, so that the angle of view on observation or on projection can be set vertically (in a direction along the center axis (rotationally symmetric axis) 1 depending on azimuths.

In this example, as the rotationally asymmetric optical element 60 is located in such a way as to be rotatable about the rotationally symmetric axis 1 of the full-panoramic optical system 50, as depicted in FIG. 17, it allows the angle of view at a specific azimuth to be set vertically.

The specifications of Example 7 are:

Horizontal angle of view: 360°,

Vertical angle of view: 40° (center angle of view of −8° (0° azimuth) to +8° (180 azimuth)) to 40° (180° azimuth), Entrance pupil diameter: 1.00 mm, and Image size: φ2.07 mm to φ5.92 mm (0° azimuth).

Set out below are the constructional parameters of the optical system according to this example. How to determine the constructional parameters of this example is the same as in Example 1.

In this example, too, the first surface 61 of the rotationally asymmetric optical element 60 comprises a rotationally asymmetric surface created by connecting together extended rotation free-form curves (a straight line in section), each with the center of rotation lying at the center axis (rotationally symmetric axis) 1 and each having a shape with a tilt angle differing per azimuth. In the constructional parameters of Example 7 given later, too, the first surface 61 is described as an extended rotation free-form surface; in actual applications, however, that surface 61 takes the form of such a rotationally asymmetric surface.

The constructional parameters in Examples and 1 and 7 are set out below, where the acronyms "ASS", "ERFS", and "RE" indicate an aspheric surface, an extended rotation free-form surface, and a reflecting surface, respectively.

EXAMPLE 1

| Surface No. | Radius of curvature | Surface separation | Displacement and tilt | Refractive index | Abbe's No. |
|---|---|---|---|---|---|
| Object plane | ∞(Object Plane) | ∞ | | | |
| 1 | ERFS[1] | | (1) | 1.5163 | 64.1 |
| 2 | ERFS[2] | | | | |
| 3 | ∞(Entrance Pupil) | | (2) | | |
| 4 | ERFS[3] | | (3) | 1.5163 | 64.1 |
| 5 | ERFS[4] (RE) | | (4) | 1.5163 | 64.1 |
| 6 | ERFS[5] (RE) | | (5) | 1.5163 | 64.1 |
| 7 | ASS[1] | | (6) | | |
| 8 | ∞(Stop) | | (7) | | |
| 9 | −10.23 | | (8) | 1.5208 | 67.0 |
| 10 | −4.76 | | (9) | | |
| 11 | −27.34 | | (10) | 1.6038 | 61.2 |
| 12 | −3.06 | | (11) | 1.7552 | 27.6 |
| 13 | −4.23 | | (12) | | |
| 14 | 6.25 | | (13) | 1.4979 | 69.3 |
| 15 | −4.40 | | (14) | 1.7509 | 32.2 |
| 16 | 14.03 | | (15) | | |
| Image plane | ∞ | | (16) | | |

ERFS[1]

| Azimuth angle | 0 | 45 | 90 | 135 | 180 (°) |
|---|---|---|---|---|---|
| RY | 11.80 | 11.44 | 9.81 | 8.49 | 8.04 |
| θ | 0.00 | | | | |
| R | 25.00 | | | | |

ERFS[2]

RY   7.70
θ    0.00
R    −18.00

ERFS[3]

RY   12.80
θ    −37.53
R    −17.20
$C_4$   $5.6233 \times 10^{-4}$

ERFS[4]

RY   −540.67
θ    −42.20
R    12.04
$C_3$   $-1.2313 \times 10^{-2}$
$C_4$   $9.0272 \times 10^{-6}$
$C_5$   $-4.1194 \times 10^{-6}$

ERFS[5]

RY   −18.83
θ    −86.79
R    5.54
$C_3$   $2.2700 \times 10^{-2}$
$C_4$   $-4.8733 \times 10^{-5}$
$C_5$   $3.9655 \times 10^{-6}$

ASS[1]

R    −60.87
k    0.0000
a    $7.5446 \times 10^{-3}$

Displacement and tilt(1)

| X | 0.00 | Y | 0.00 | Z | −6.00 |
|---|---|---|---|---|---|
| α | 0.00 | β | 0.00 | γ | 0.00 |

Displacement and tilt(2)

| X | 0.00 | Y | 0.00 | Z | −17.20 |
|---|---|---|---|---|---|
| α | 0.00 | β | 0.00 | γ | 0.00 |

Displacement and tilt(3)

| X | 0.00 | Y | 0.00 | Z | 0.00 |
|---|---|---|---|---|---|
| α | 0.00 | β | 0.00 | γ | 0.00 |

Displacement and tilt(4)

| X | 0.00 | Y | −7.22 | Z | 0.00 |
|---|---|---|---|---|---|
| α | 0.00 | β | 0.00 | γ | 0.00 |

Displacement and tilt(5)

| X | 0.00 | Y | 11.14 | Z | 0.00 |
|---|---|---|---|---|---|
| α | 0.00 | β | 0.00 | γ | 0.00 |

Displacement and tilt(6)

| X | 0.00 | Y | −11.92 | Z | 0.00 |
|---|---|---|---|---|---|
| α | −90.00 | β | 0.00 | γ | 0.00 |

Displacement and tilt(7)

| X | 0.00 | Y | −12.42 | Z | 0.00 |
|---|---|---|---|---|---|
| α | −90.00 | β | 0.00 | γ | 0.00 |

Displacement and tilt(8)

| X | 0.00 | Y | −12.92 | Z | 0.00 |
|---|---|---|---|---|---|
| α | −90.00 | β | 0.00 | γ | 0.00 |

Displacement and tilt(9)

| X | 0.00 | Y | −14.58 | Z | 0.00 |
|---|---|---|---|---|---|
| α | −90.00 | β | 0.00 | γ | 0.00 |

Displacement and tilt(10)

| X | 0.00 | Y | −14.68 | Z | 0.00 |
|---|---|---|---|---|---|
| α | −90.00 | β | 0.00 | γ | 0.00 |

Displacement and tilt(11)

| X | 0.00 | Y | −16.18 | Z | 0.00 |
|---|---|---|---|---|---|
| α | −90.00 | β | 0.00 | γ | 0.00 |

Displacement and tilt(12)

| X | 0.00 | Y | −17.18 | Z | 0.00 |
|---|---|---|---|---|---|
| α | −90.00 | β | 0.00 | γ | 0.00 |

Displacement and tilt(13)

| X | 0.00 | Y | −17.28 | Z | 0.00 |
|---|---|---|---|---|---|
| α | −90.00 | β | 0.00 | γ | 0.00 |

Displacement and tilt(14)

| X | 0.00 | Y | −19.78 | Z | 0.00 |
|---|---|---|---|---|---|
| α | −90.00 | β | 0.00 | γ | 0.00 |

Displacement and tilt(15)

| X | 0.00 | Y | −20.78 | Z | 0.00 |
|---|---|---|---|---|---|
| α | −90.00 | β | 0.00 | γ | 0.00 |

Displacement and tilt(16)

| X | 0.00 | Y | −24.07 | Z | 0.00 |
|---|---|---|---|---|---|
| α | −90.00 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞(Object Plane) | ∞ | | | |
| 1 | ERFS[1] | | (1) | 1.5163 | 64.1 |
| 2 | ERFS[2] | | | | |
| 3 | ∞(Entrance Pupil) | | (2) | | |
| 4 | ERFS[3] | | (3) | 1.5163 | 64.1 |
| 5 | ERFS[4] (RE) | | (4) | 1.5163 | 64.1 |
| 6 | ERFS[5] (RE) | | (5) | 1.5163 | 64.1 |
| 7 | ASS[1] | | (6) | | |
| 8 | ∞(Stop) | | (7) | | |
| 9 | −10.23 | | (8) | 1.5208 | 67.0 |
| 10 | −4.76 | | (9) | | |
| 11 | −27.34 | | (10) | 1.6038 | 61.2 |
| 12 | −3.06 | | (11) | 1.7552 | 27.6 |

-continued

| | | | | | |
|---|---|---|---|---|---|
| 13 | −4.23 | | (12) | | |
| 14 | 6.25 | | (13) | 1.4979 | 69.3 |
| 15 | −4.40 | | (14) | 1.7509 | 32.2 |
| 16 | 14.03 | | (15) | | |
| Image plane | ∞ | | (16) | | |

ERFS[1]

| | | | | | |
|---|---|---|---|---|---|
| RY | ∞ | | | | |
| Azimuth angle | 0 | 45 | 90 | 135 | 180 (°) |
| θ | 14.76 | 7.63 | 0.00 | −7.63 | −14.77 |
| R | −25.00 | | | | |

ERFS[2]

| | |
|---|---|
| RY | ∞ |
| θ | 0.00 |
| R | −18.00 |

ERFS[3]

| | |
|---|---|
| RY | 12.80 |
| θ | −37.53 |
| R | −17.20 |
| $C_4$ | $5.6233 \times 10^{-4}$ |

ERFS[4]

| | |
|---|---|
| RY | −540.67 |
| θ | −42.20 |
| R | 12.04 |
| $C_3$ | $-1.2313 \times 10^{-2}$ |
| $C_4$ | $9.0272 \times 10^{-6}$ |
| $C_5$ | $-4.1194 \times 10^{-6}$ |

ERFS[5]

| | |
|---|---|
| RY | −18.83 |
| θ | −86.79 |
| R | 5.54 |
| $C_3$ | $2.2700 \times 10^{-2}$ |
| $C_4$ | $-4.8733 \times 10^{-5}$ |
| $C_5$ | $3.9655 \times 10^{-6}$ |

ASS[1]

| | |
|---|---|
| R | −60.87 |
| k | 0.0000 |
| a | $7.5446 \times 10^{-3}$ |

Displacement and tilt(1)

| | | | | | |
|---|---|---|---|---|---|
| X | 0.00 | Y | 0.00 | Z | 0.00 |
| α | 0.00 | β | 0.00 | γ | 0.00 |

Displacement and tilt(2)

| | | | | | |
|---|---|---|---|---|---|
| X | 0.00 | Y | 0.00 | Z | −17.20 |
| α | 0.00 | β | 0.00 | γ | 0.00 |

Displacement and tilt(3)

| | | | | | |
|---|---|---|---|---|---|
| X | 0.00 | Y | 0.00 | Z | 0.00 |
| α | 0.00 | β | 0.00 | γ | 0.00 |

Displacement and tilt(4)

| | | | | | |
|---|---|---|---|---|---|
| X | 0.00 | Y | −7.22 | Z | 0.00 |
| α | 0.00 | β | 0.00 | γ | 0.00 |

Displacement and tilt(5)

| | | | | | |
|---|---|---|---|---|---|
| X | 0.00 | Y | 11.14 | Z | 0.00 |
| α | 0.00 | β | 0.00 | γ | 0.00 |

Displacement and tilt(6)

| | | | | | |
|---|---|---|---|---|---|
| X | 0.00 | Y | −11.92 | Z | 0.00 |
| α | −90.00 | β | 0.00 | γ | 0.00 |

Displacement and tilt(7)

| | | | | | |
|---|---|---|---|---|---|
| X | 0.00 | Y | −12.42 | Z | 0.00 |
| α | −90.00 | β | 0.00 | γ | 0.00 |

Displacement and tilt(8)

| | | | | | |
|---|---|---|---|---|---|
| X | 0.00 | Y | −12.92 | Z | 0.00 |
| α | −90.00 | β | 0.00 | γ | 0.00 |

Displacement and tilt(9)

| | | | | | |
|---|---|---|---|---|---|
| X | 0.00 | Y | −14.58 | Z | 0.00 |
| α | −90.00 | β | 0.00 | γ | 0.00 |

Displacement and tilt(10)

| | | | | | |
|---|---|---|---|---|---|
| X | 0.00 | Y | −14.68 | Z | 0.00 |
| α | −90.00 | β | 0.00 | γ | 0.00 |

Displacement and tilt(11)

| | | | | | |
|---|---|---|---|---|---|
| X | 0.00 | Y | −16.18 | Z | 0.00 |
| α | −90.00 | β | 0.00 | γ | 0.00 |

Displacement and tilt(12)

| | | | | | |
|---|---|---|---|---|---|
| X | 0.00 | Y | −17.18 | Z | 0.00 |
| α | −90.00 | β | 0.00 | γ | 0.00 |

Displacement and tilt(13)

| | | | | | |
|---|---|---|---|---|---|
| X | 0.00 | Y | −17.28 | Z | 0.00 |
| α | −90.00 | β | 0.00 | γ | 0.00 |

Displacement and tilt(14)

| | | | | | |
|---|---|---|---|---|---|
| X | 0.00 | Y | −19.78 | Z | 0.00 |
| α | −90.00 | β | 0.00 | γ | 0.00 |

Displacement and tilt(15)

| | | | | | |
|---|---|---|---|---|---|
| X | 0.00 | Y | −20.78 | Z | 0.00 |
| α | −90.00 | β | 0.00 | γ | 0.00 |

Displacement and tilt(16)

| | | | | | |
|---|---|---|---|---|---|
| X | 0.00 | Y | −24.07 | Z | 0.00 |
| α | −90.00 | β | 0.00 | γ | 0.00 |

Figure 19:
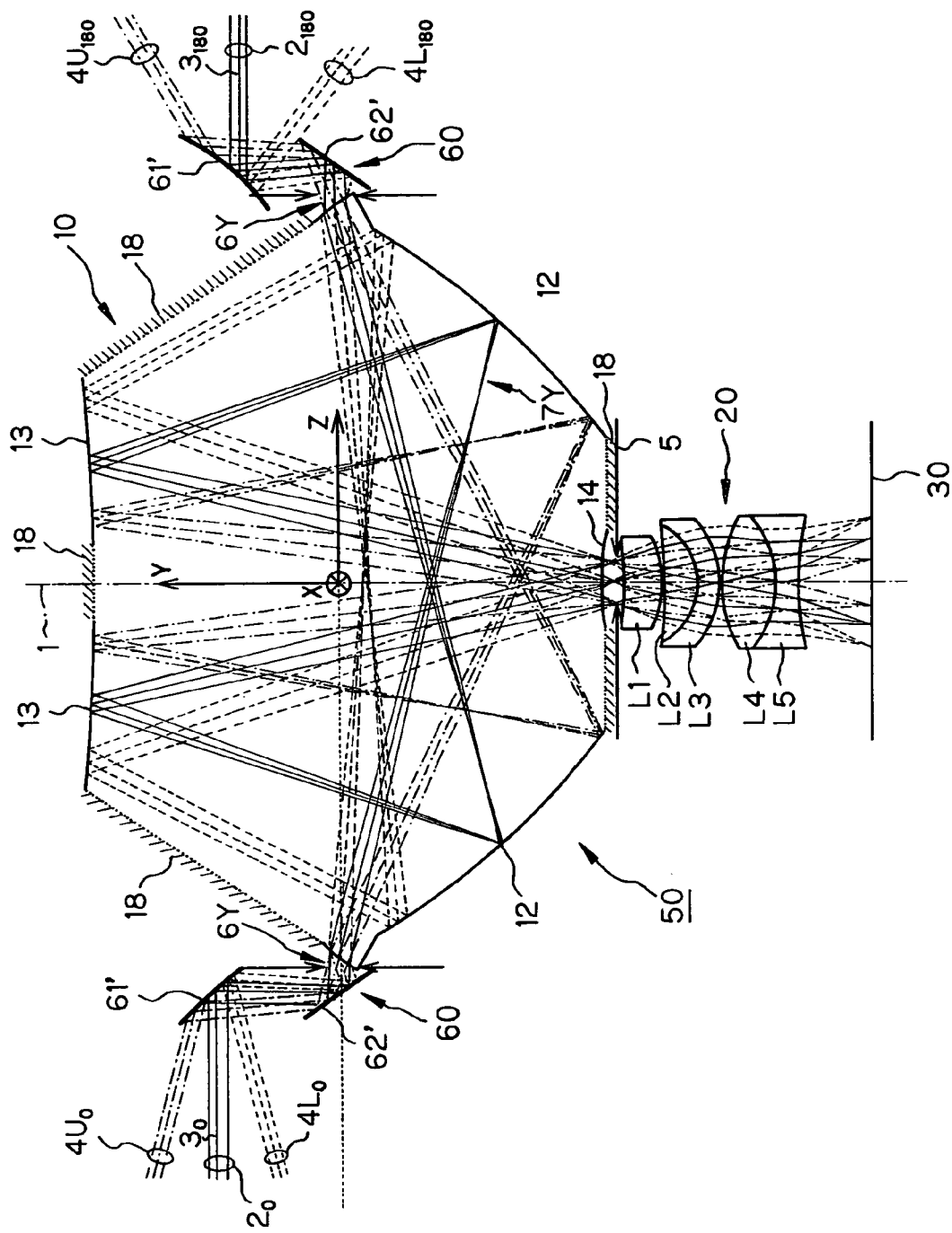
FIG. 19 is illustrative in section, as in FIG. 1, of the rotationally asymmetric optical system according to Example 8.

Example 8 is now explained with reference to FIG. 19 similar to FIG. 1. In this example, a rotationally asymmetric optical element 60 that differs in angular magnification depending on azimuths is constructed using two reflecting surfaces 61' and 62', wherein the reflecting surface 61' has a surface shape continuously varying in both the meridional and sagittal directions depending on azimuths. The use of the reflecting surfaces 61' and 62' for the rotationally asymmetric optical element 60 also works for improvements in resolving power, because there is no chromatic aberration occurring from it. Since there is shading of light beams, however, the reflecting surface 61' must be decentered in the meridional section. Here, if the odd-number degree term of the extended rotation free-form surface is applied to the reflecting surfaces 61' and 62', it is then possible to obtain good results. Further, if the rotationally asymmetric optical element 60 is constructed using a cylindrical block comprising just only two reflecting surfaces but also two transmitting surfaces, it is preferable because the mechanism for retaining the reflecting surfaces can be simplified.

In this example, too, the full-panoramic optical system 50 is the same as in Example 1, and is not explained any more.

Figure 20:
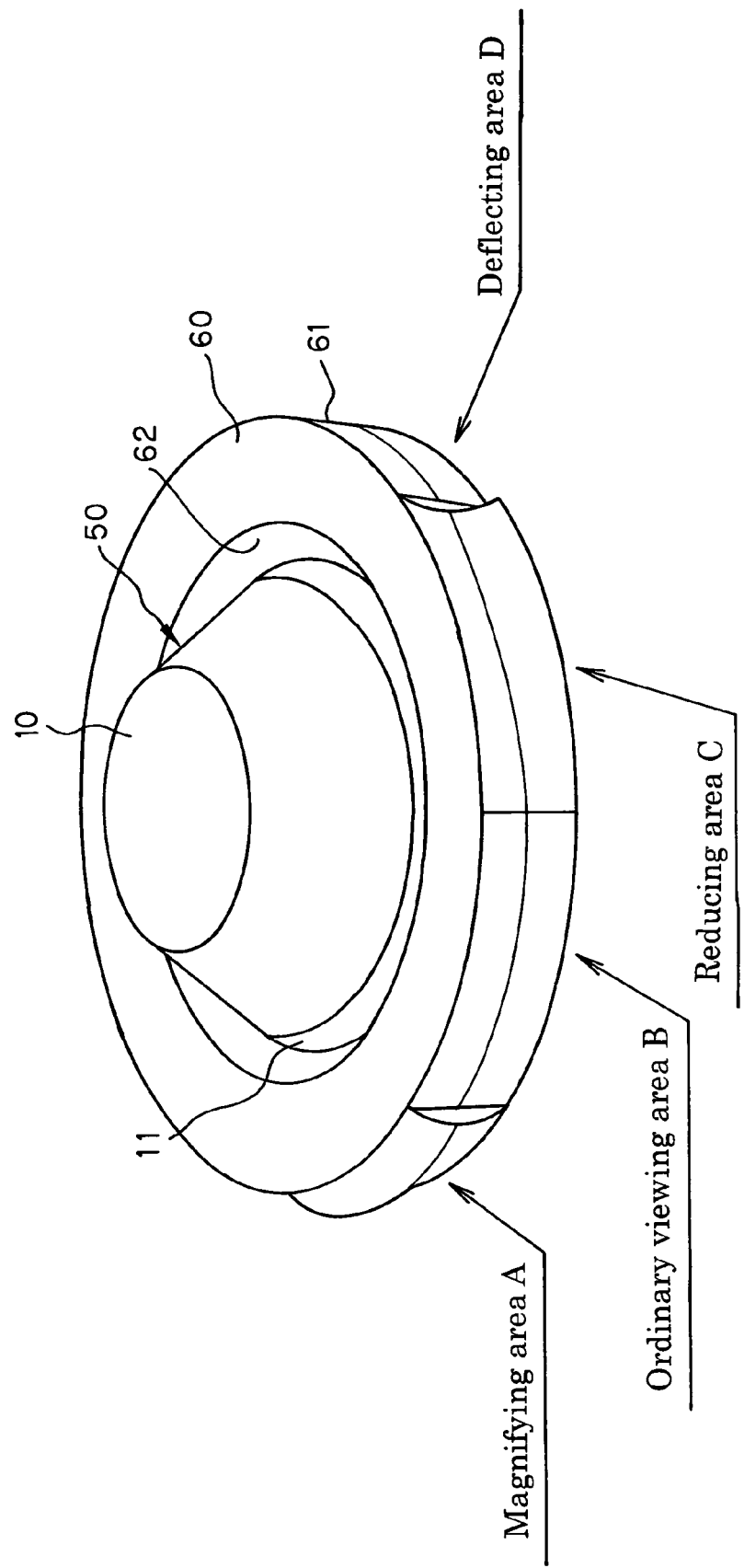
FIG. 20 is illustrative in schematic perspective of the rotationally asymmetric optical system according to Example 9.

Example 9 is now explained with reference to FIG. 20 similar to FIG. 12. The foregoing examples are each directed to an optical system for picking up or projecting images in the full 360°-direction range with uninterruptedly or continuously varying magnifications, or with continuously deflections. With this example, however, any desired azimuth range can be plucked out with varying magnifications or angles of deflection. Specifically, as shown in FIG. 20, a rotationally asymmetric optical element 60 is configured into a cylindrical form having a circumferentially divided, discontinuous optical surface 61 (and also a second transmitting surface 62). For instance, the optical surface 61 is circumferentially divided into segments A, B, C and D, wherein A is a magnifying area, B an ordinary viewing area, C a reduction area, and D an area where the angle of view on observation is deflected.

Apart from or besides Examples 1-9 mentioned above, the optical system of the invention could be designed such that it is usable only at any arbitrary angle of ½, ¾, ¼ or the like about the center axis 1 and in a section including the center axis 1, without being contrary to the purport of the invention. For instance, when it is used in an angular range of ½ in the circumferential direction, it is not always necessary to bring an imaging device located on the image plane 30 in alignment with the center of the rotationally symmetric axis 1 of a full-panoramic optical system 50. In other words, if the imaging device is located with a shift from, or a decentration to, the rotationally symmetric axis 1, it is then possible to make effective use of pixels of the imaging device.

Throughout the invention, every type could be applied to the full-panoramic optical system 50 used herein. That is, just only what has been known from Patent Publications 1-13, etc. but also such embodiments as described below could be used. In these embodiments, the entrance pupil 6Y is located near the first transmitting surface 11.

Figure 21:
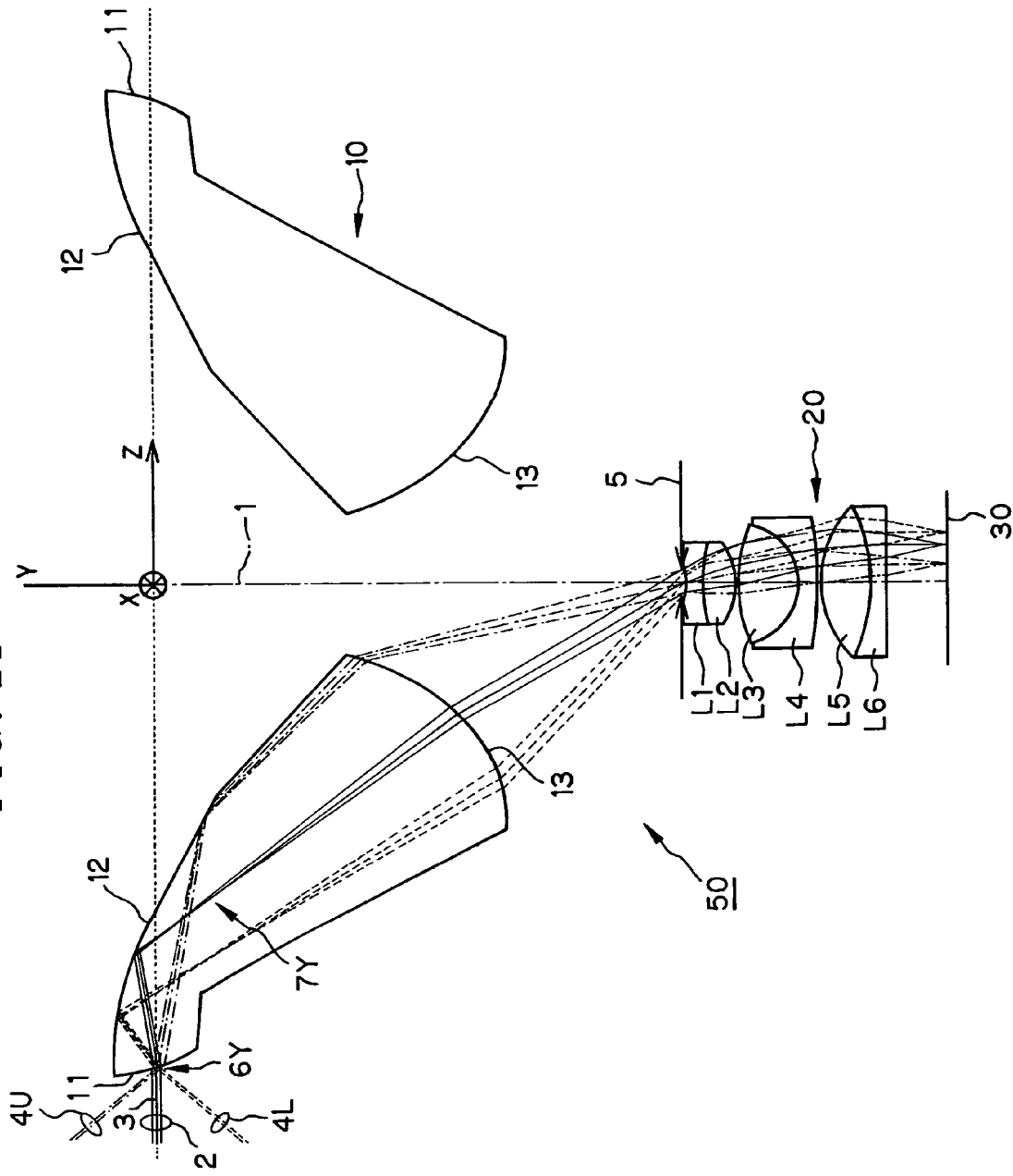
FIG. 21 is illustrative in section of a full-panoramic optical system which is usable herein and takes a form that includes at least one reflecting surface rotationally symmetric about the center axis and is capable of one reflection, as taken along the center axis.

FIG. 21 is illustrative in section of an embodiment of the full-panoramic optical system 50 including one reflecting surface 12 rotationally symmetric about a center axis and capable of one reflection, as taken along its center axis (rotationally symmetric axis) 1.

The full-panoramic optical system 50 here comprises a front unit 10 rotationally symmetric about the center axis 1, a rear unit 20 rotationally symmetric about the center axis 1 and an aperture 5 located coaxially with the center axis 1. A light beam 2 coming from an object in the distance passes successively through the front unit 10 and the rear unit 20, forming an image at a position of an image plane 30 vertical to, and off, the center axis 1. With the center axis 1 set perpendicularly (vertically), for instance, there is an annular image formed on the image plane 30, which has a full 360°-direction (full-panoramic) angle of view with a zenithal direction lying at the center of the image and a ground direction lying at an outer circle.

The front unit 10 comprises a resin or other transparent medium that is rotationally symmetric about the center axis 1 and has a refractive index greater than 1, and includes one internal reflecting surface 12 and two transmitting surfaces 11 and 13, each being of a shape rotationally symmetric about the center axis 1. The rear unit 20 comprises a three-unit lens system including six lenses L1 to L6.

And then, the transparent medium of the front unit 10 comprises a first transmitting surface 11 for reception of the light beam 2 coming from afar, a reflecting surface 12 which is located on the same side as the first transmitting surface 11 with respect to the center axis 1 and on which a light beam passing from the first transmitting surface 11 is incident, and a second transmitting surface 13 which is again positioned on the same side as the first transmitting surface 11 with respect to the center axis 1 and faces the rear unit 20 and on which a light beam reflected at the reflecting surface 12 is incident. For instance, these surfaces are each composed of an extended rotation free-form surface.

The lens system that forms the rear unit 20 comprises, in order from the front unit 10 side, a cemented lens consisting of a double-concave negative lens L1 and a double-convex positive lens L2, a cemented lens consisting of a double-convex positive lens L3 and a negative meniscus lens L4 concave on its front unit 10 side, and a cemented lens consisting of a double-convex positive lens L5 and a negative meniscus lens L6 concave on its front unit 10 side.

With the center axis 1 lying in the perpendicular direction, a center light beam 2 coming from afar in the horizontal direction is refracted through the first transmitting surface 11 that is an entrance surface, entering the transparent medium of the front unit 10. Then, the light beam is incident on the reflecting surface 12 where it is reflected toward the rear unit 20. Then, the reflected light beam is refracted through the second transmitting surface 13, leaving the transparent medium of the front unit 10. Finally, the light beam enters the rear unit 20 via the aperture 5 to form an image at a radially given position of the image plane 30 off the center axis 1.

In the optical system of this example, the aperture (stop) 5 positioned between the front unit 10 and the second unit 20 is back projected onto the object side to form an entrance pupil 6Y, lying in a sectional direction including the center axis 1, near the first transmitting surface 11.

In a section including the center axis 1 (FIG. 21), light beams 2, 4U and 4L (4U is a light beam incident from the sky side in the distance and 4L is a light beam incident from the ground side in the distance) form an image once at a position 7Y between the reflecting surface 11 and the second transmitting surface 13 and nearer to the reflecting surface 11, while in a plane that is orthogonal to the plane including the center axis 1 and includes the center ray 3 of the light beam 2, they do not form any intermediate real image.

Figure 22:
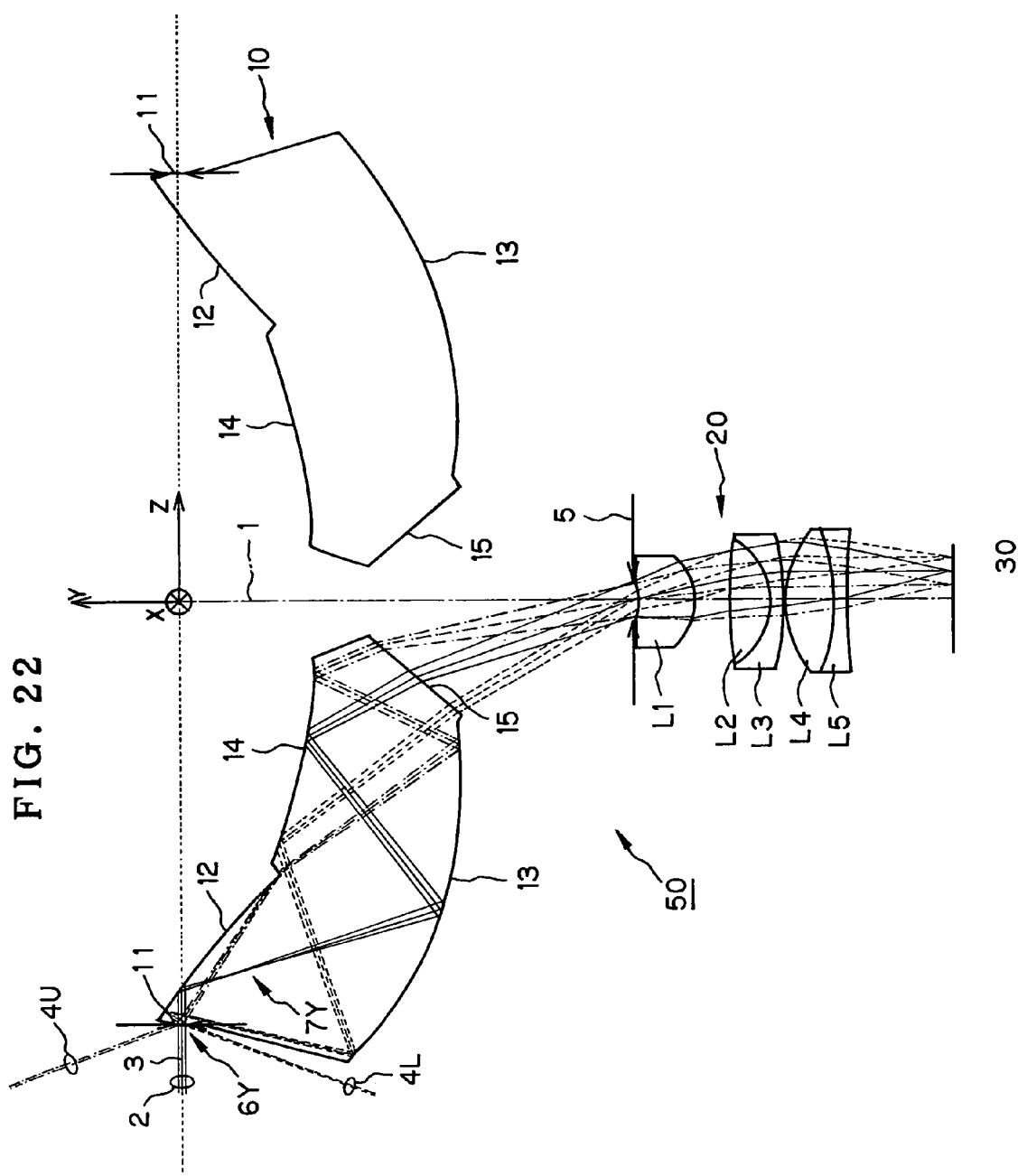
FIG. 22 is illustrative in section of a full-panoramic optical system which is usable herein and takes a form that includes three reflecting surfaces rotationally symmetric about the center axis and is capable of three reflections, as taken along the center axis.

FIG. 22 is illustrative in section of another embodiment of the full-panoramic optical system 50 comprising three reflecting surfaces 12 rotationally symmetric about a center axis and capable of three reflections, as taken along a center axis (rotationally symmetric axis) 1.

The full-panoramic optical system 50 here comprises a front unit 10 rotationally symmetric about the center axis 1, a rear unit 20 rotationally symmetric about the center axis 1 and an aperture 5 located coaxially with the center axis 1. A light beam 2 coming from an object in the distance passes successively through the front unit 10 and the rear unit 20, forming an image at a position of an image plane 30 vertical to, and off, the center axis 1. With the center axis 1 set perpendicularly (vertically), for instance, there is an annular image formed on the image plane 30, which has a full 360°-direction (full-panoramic) angle of view with a zenithal direction lying at the center of the image and a ground direction lying at an outer circle.

The front unit 10 comprises a resin or other transparent medium that is rotationally symmetric about the center axis 1 and has a refractive index greater than 1, and includes three internal reflecting surfaces 12, 13, 14 and two transmitting surfaces 11, 15, each being of a shape rotationally symmetric about the center axis 1. The rear unit 20 is a three-unit lens system including six lenses L1 to L6.

And then, the transparent medium of the front unit 10 comprises a first transmitting surface 11 for reception of a light beam coming from afar, a first reflecting surface 12 which is located on the same side as the first transmitting surface 11 with respect to the center axis and on which a light beam passing through the first transmitting surface 11 is incident, a second reflecting surface 13 which is positioned on the same side as the first reflecting surface 12 and on which a light beam reflected at the first reflecting surface 12 is incident, a third reflecting surface 14 which is positioned on the same side as the first reflecting surface 12 and the second reflecting surface 13 and on which a light beam reflected at the second reflecting surface 12 is incident, and a second transmitting surface 15 which faces the rear unit 20 and on which a light beam reflected at the third reflecting surface 14 is incident. For instance, such surfaces are each composed of an extended rotation free-form surface.

Between the front unit 10 and the rear unit 20, there is provided a stop-forming circular aperture 5 coaxial with the center axis.

The lens system that forms the rear unit 20 comprises, in order from the front unit 10 side, a negative meniscus lens L1 concave on its front unit 10 side, a cemented lens consisting of a double-convex positive lens L2 and a negative meniscus lens L3 concave on its front unit 10 side, and a cemented lens consisting of a double-convex positive lens L4 and a double-concave negative lens L5.

With the center axis 1 lying in the perpendicular direction and the optical system directed toward the zenith, a center light beam 2 coming from afar in the horizontal direction is refracted through the first transmitting surface 11 that is an entrance surface, entering the transparent medium of the front unit 10 for incidence on the first reflecting surface 12 where the light beam 2 is reflected toward the rear unit 20. Then, the reflected light beam is incident on the second reflecting surface 13 where it is reflected away from the rear unit 20. Then, the reflected light is incident on the third reflecting surface 14 where it is reflected toward the rear unit 20. Finally, the reflected light beam is refracted through the second transmitting surface 15, leaving the transparent medium of the front unit 10 and entering the rear unit 20 via the aperture 5 to form an image at a radially given position of the image plane 30 off the center axis 1.

In the optical system of this example, the aperture (stop) 5 positioned between the front unit 10 and the rear unit 20 is back projected onto the object side to form an entrance pupil 6Y, lying in a sectional direction including the center axis, near the first transmitting surface 11.

In a section including the center axis 1 (FIG. 22), light beams 2, 4U and 4L (4U is a light beam incident from the sky side in the distance and 4L is a light beam incident from the ground side in the distance) form an image once at a position 7Y between the first reflecting surface 12 and the second reflecting surface 13, while in a plane that is orthogonal to the plane including the center axis 1 and includes the center ray 3 of the light beam 2, they do not form any intermediate real image.

Figure 23:
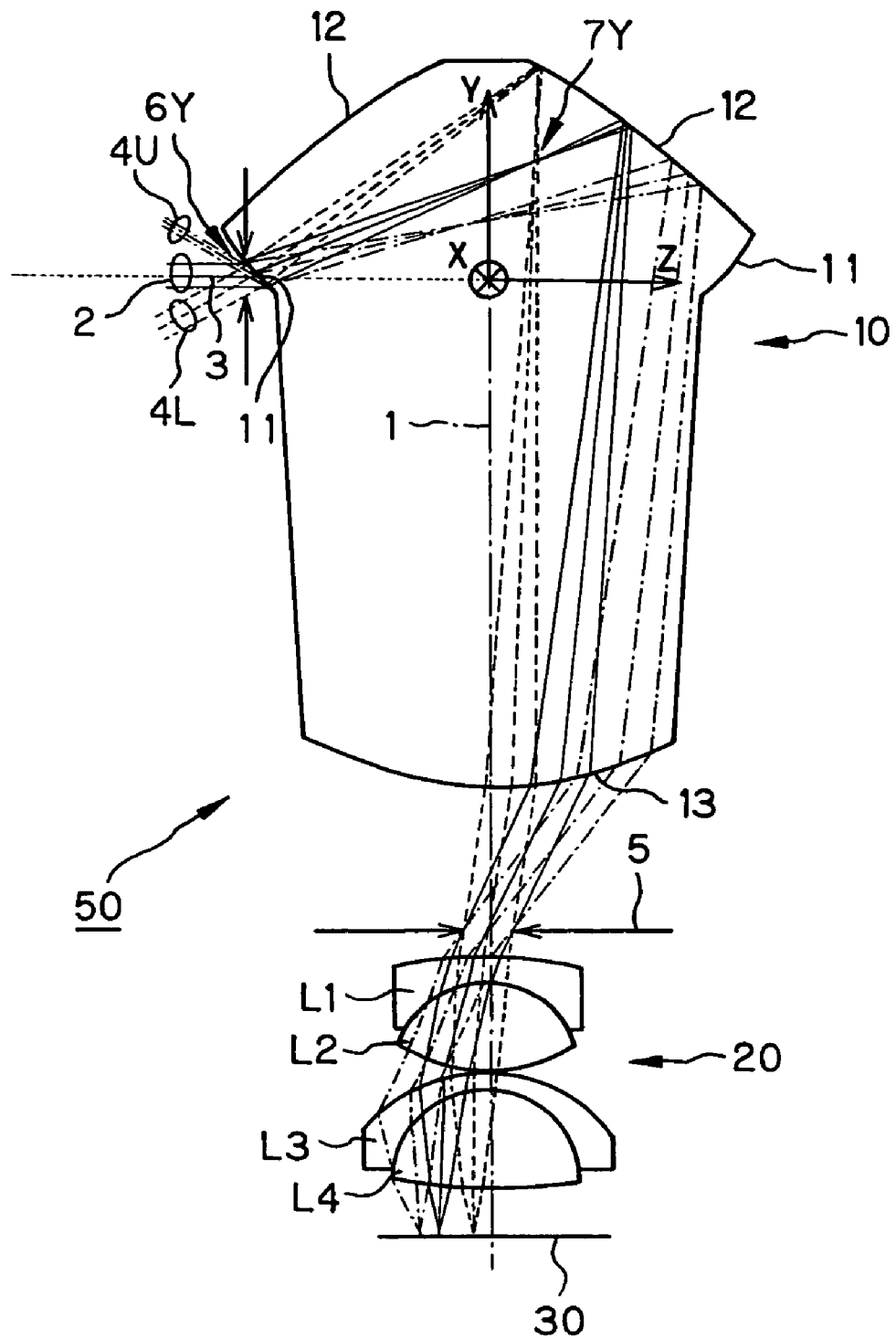
FIG. 23 is illustrative in section of a full-panoramic optical system which is usable herein and takes another form that including at least one reflecting surface rotationally symmetric about the center axis and is capable of one reflection, as taken along the center axis.

FIG. 23 is illustrative in section of yet another embodiment of the full-panoramic optical system 50 comprising one reflecting surfaces 12 rotationally symmetric about a center axis and capable of one reflection, as taken along a center axis (rotationally symmetric axis) 1.

The full-panoramic optical system 50 here comprises a front unit 10 rotationally symmetric about the center axis 1, a rear unit 20 rotationally symmetric about the center axis 1 and an aperture 5 located between the front unit 10 and the rear unit 20 and coaxial with the center axis 1. A light beam 2 coming from an object in the distance passes successively through the front unit 10 and the rear unit 20, forming an image at a position of an image plane 30 vertical to, and off, the center axis 1. With the center axis 1 set perpendicularly (vertically), for instance, there is an annular image formed on the image plane 30, which has a full 360°-direction (full-panoramic) angle of view with the zenithal direction being away from the center of the image and the ground direction lying at an inner circle.

The front unit 10 comprises a resin or other transparent medium that is rotationally symmetric about the center axis 1 and has a refractive index greater than 1, and includes one reflecting surface 12 and two transmitting surfaces 11, 13, each being of a shape rotationally symmetric about the center axis 1. The rear unit 20 is a two-unit lens system including four lenses L1 to L4.

And then, the transparent medium of the front unit comprises a first transmitting surface for reception of a light beam 2 coming from afar, an internal reflecting surface 12 which is located oppositely to the first transmitting surface 11 with the center axis 1 between them and on which a light beam passing through the first transmitting surface 11 is incident, and a second transmitting surface 13 which faces the rear unit 20 and on which a light beam reflected at the internal reflecting surface 12 is incident, each composed of, for instance, an extended rotation free-form surface.

The lens system that forms the rear unit 20 comprises, in order from the front unit 10 side, a cemented lens consisting of a negative meniscus lens L1 convex on its front unit 10 side and a double-convex positive lens L2, and a cemented lens consisting of a negative meniscus lens L3 convex on its front unit 10 side and a double-convex positive lens L4.

With the center axis 1 lying in the perpendicular direction and an image plane 30 lying in the zenithal direction, a center light beam 2 coming from afar in the horizontal direction is refracted through the first transmitting surface 11 that is an entrance surface, entering the transparent medium of the front unit 10 for incidence on the internal reflecting surface 12 where the light beam 2 is reflected toward the rear unit 20. Then, the reflected light is refracted through the second transmitting surface 13, leaving the transparent medium of the front unit 10 and entering the rear unit 20 via the aperture 5 to form an image at a radially given position of the image plane 30 off the center axis 1.

In the optical system of this example, the aperture (stop) 5 positioned between the front unit 10 and the rear unit 20 is projected onto the object side to form an entrance pupil 6Y near the first transmitting surface 11 in the meridional section, and on the center axis (rotationally symmetric axis) 1 in the sagittal section.

In a section including the center axis (the meridional section: FIG. 23), light beams 2, 4U and 4L coming from afar via the entrance pupil 6Y forms an image once at a position between the first transmitting surface 11 and the internal reflecting surface 12 and nearer to the internal reflecting surface 12, and in a plane (the sagittal section) that is orthogonal to a plane including the center axis 1 and includes the center ray 3 of the light beam 2, they form an image once at a position between the internal reflecting surface 12 and the second transmitting surface 13 and nearer to the internal reflecting surface 12.

Figure 24A:
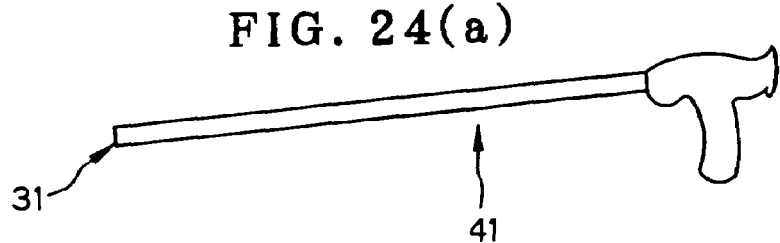
FIG. 24 is illustrative of an example of using the panoramic taking optical system of the invention as a taking optical system at the endmost portion of an endoscope.
Figure 24B:
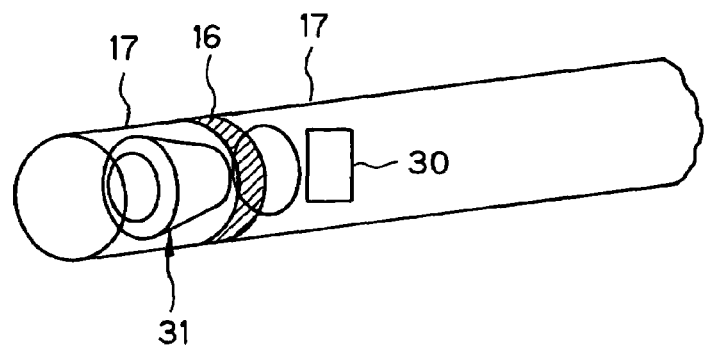
Figure 24C:
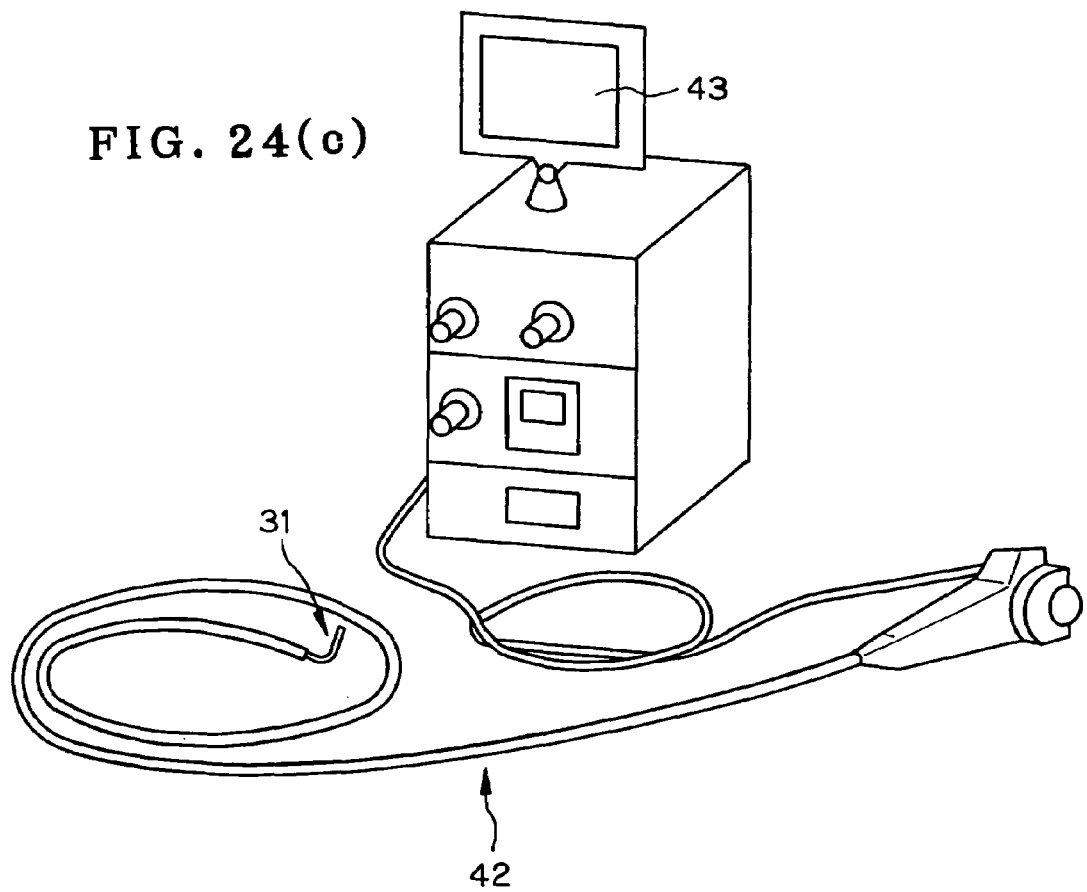

Specific examples of the rotationally asymmetric optical system of the invention applied in the form of a panoramic taking optical system 31 or panoramic projection optical system 32 are now explained. FIG. 24 is generally illustrative of an example of the panoramic taking optical system 31 of the invention used as a taking optical system attached to the endmost portion of an endoscope. More specifically, FIG. 24(a) is illustrative of the panoramic taking optical system 31 of the invention that is attached to the endmost portion of a hard endoscope 41 to take and view a full 360°-direction image, and FIG. 24(b) is illustrative in schematic of that endmost portion. Around the rotationally asymmetric optical element 60 in the panoramic taking optical system 31, there is located a flare stop 17 comprising a casing having a slit aperture 16 that extends in a circumferential direction thereby preventing incidence of flare light. FIG. 24(c) is illustrative of an embodiment wherein the inventive panoramic taking optical system 31 is likewise attached to the endmost portion of a soft electronic endoscope 42, so that a taken image is shown on a display device 43 with distortions subjected to image processing for correction.

Figure 25A:
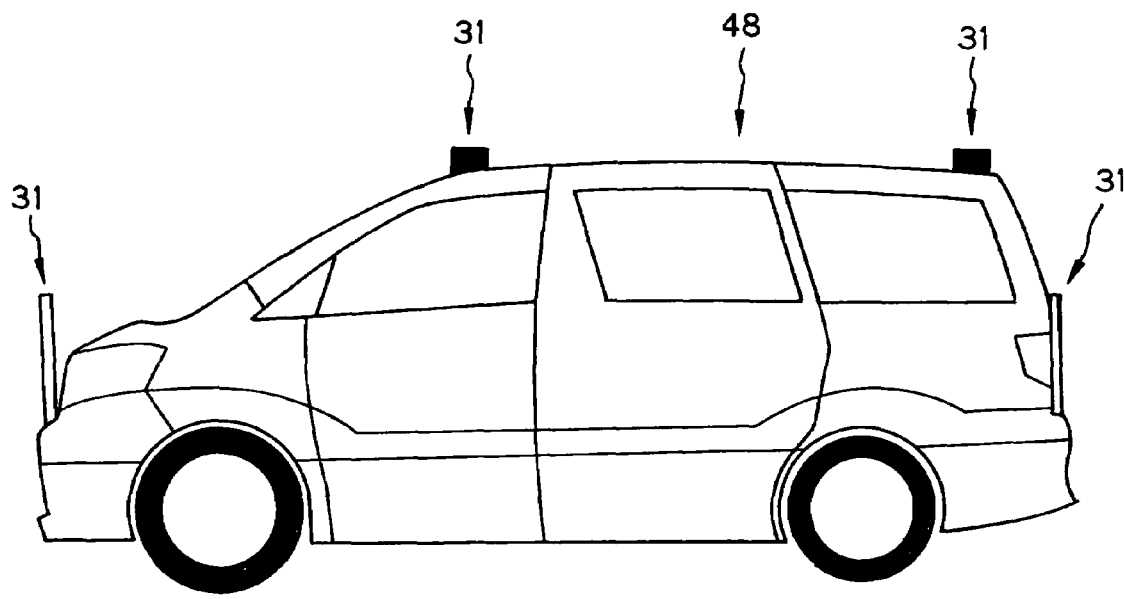
FIG. 25 is illustrative of one example of using the panoramic taking optical system of the invention as taking optical systems at the pole tops of the corners and head of a car.
Figure 25B:
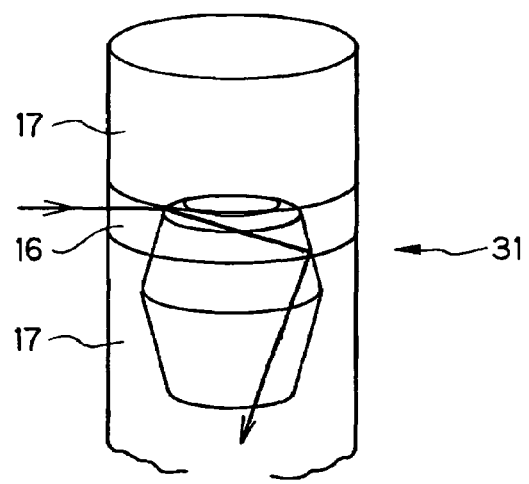

FIG. 25(a) is illustrative of a plurality of inventive panoramic taking optical systems 31 that are attached to the corners and head's poles of a car 48 as taking optical systems to display images taken via the panoramic taking optical systems 31 simultaneously on an interior display after image processing for correction of distortion, and FIG. 25(b) is illustrative in schematic of the endmost portion thereof. Around the rotationally asymmetric optical element 60 in each panoramic taking optical system 31, there is located a flare stop 17 comprising a casing having a slit aperture 16 that extends in a circumferential direction thereby preventing incidence of flare light.

Figure 26:
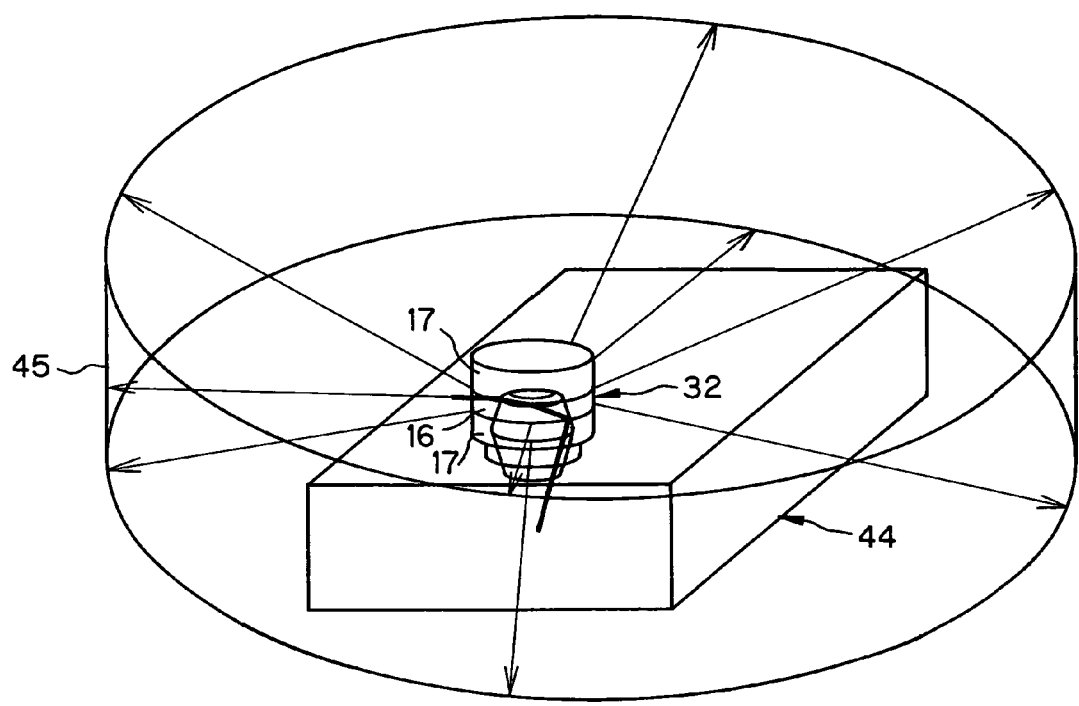
FIG. 26 is illustrative of one example of using the panoramic projection optical system as a projection optical system in a projector.

FIG. 26 is illustrative of an example of a projector 44 in which the panoramic projection optical system 32 of the invention is used as its projection optical system. A panoramic image is displayed on a display device located on the image plane of the system 32, so that a full 360°-direction image is projected and displayed on a full 360°-direction screen 45 through the panoramic optical system 32.

Figure 27:
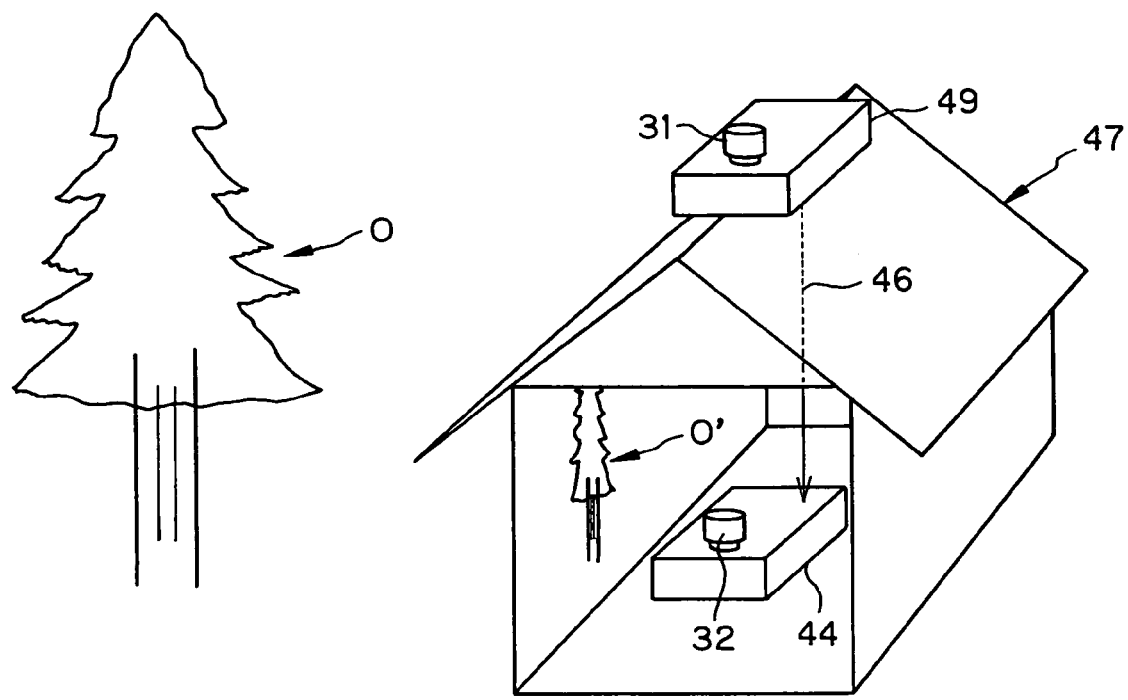
FIG. 27 is illustrative of an example of taking an image of a subject outside a house using the panoramic taking optical system of the invention to project and display it within the house through the panoramic projection optical system of the invention.

FIG. 27 is illustrative of a taking device 49 using the panoramic taking optical system 31 of the invention, which is attached to the outside of a house 47, and a projector 44 using the panoramic projection optical system 32 of the invention, which is located inside. An image picked up by the taking device 49 is sent to the projector 44 via an electric wire 46. Such being the arrangement, a full 360°-direction subject O outside the house is taken by the taking device 49 via the panoramic taking optical system 31, and image signals are sent to the projector 44 via the electric wire 46. An image of the subject is displayed on a display device located on an image plane, so that the image O' of the subject O is projected and displayed on the inside wall surface or the like of the house via the panoramic projection optical system 32.

I claim:

1. A rotationally asymmetric optical system, comprising a full-panoramic optical system which includes at least one reflecting surface rotationally symmetric about a center axis, is rotationally symmetric about the center axis, and is adapted to form a full 360°-direction image on an image plane or project an image located on the image plane onto a full 360°-direction angle of view, and a rotationally asymmetric optical element which is located in such a way as to surround a full circumference of an entrance surface of said full-panoramic optical system in order of travel of light rays in the case of an image-formation optical system, and in reverse order of travel of light rays in the case of a projection optical system, and is rotationally asymmetric about the center axis.

2. The rotationally asymmetric optical system according to claim 1, wherein said rotationally asymmetric optical element differs in angular magnification depending on an azimuth.

3. The rotationally asymmetric optical system according to claim 2, wherein said rotationally asymmetric optical element comprises only a refracting surface.

4. The rotationally asymmetric optical system according to claim 2, wherein said rotationally asymmetric optical element includes a reflecting surface.

5. The rotationally asymmetric optical system according to claim 2, which satisfies the following conditions (1) and (2) with respect to $\Delta Pm$ indicative of a power change due to an azimuth of said rotationally asymmetric optical element in a section including the center axis and $\Delta Ps$ indicative of a power change due to an azimuth of said rotationally asymmetric optical element in a section that is orthogonal to the section including the center axis and including a center ray:

$$\Delta Pm < 0.1(1/\text{mm}) \quad (1)$$

$$\Delta Ps < 0.1(1/\text{mm}) \quad (2).$$

6. The rotationally asymmetric optical system according to claim 1, wherein said rotationally asymmetric optical element differs in an angle of deflection along the center axis depending on an azimuth.

7. The rotationally asymmetric optical system according to claim 6, wherein said rotationally asymmetric optical element comprises only a refracting surface.

8. The rotationally asymmetric optical system according to claim 6, wherein said rotationally asymmetric optical element includes a reflecting surface.

9. The rotationally asymmetric optical system according to claim 6, which satisfies the following conditions (1) and (2) with respect to $\Delta Pm$ indicative of a power change due to an azimuth of said rotationally asymmetric optical element in a section including the center axis and $\Delta Ps$ indicative of a power change due to an azimuth of said rotationally asymmetric optical element in a section that is orthogonal to the section including the center axis and including a center ray:

$$\Delta Pm < 0.1(1/\text{mm}) \quad (1)$$

$$\Delta Ps < 0.1(1/\text{mm}) \quad (2).$$

10. The rotationally asymmetric optical system according to claim 1, wherein, in order of travel of light rays in the case of the image-formation optical system, and in reverse order of travel of light rays in the case of the projection optical system, a light beam incident at each azimuth from the entrance surface of said full-panoramic optical system passes through said optical full-panoramic optical system to form an image at a position of the image plane off the center axis, and said rotationally asymmetric optical element differs in at least one of angular magnification in a section including the center axis and angular magnification in a section that is orthogonal to the first-mentioned section and includes a center ray of said light beam depending an azimuth.

11. The rotationally asymmetric optical system according to claim 10, wherein said rotationally asymmetric optical element comprises only a refracting surface.

12. The rotationally asymmetric optical system according to claim 10, wherein said rotationally asymmetric optical element includes a reflecting surface.

13. The rotationally asymmetric optical system according to claim 1, wherein said rotationally asymmetric optical element comprises only a refracting surface.

14. The rotationally asymmetric optical system according to claim 1, wherein said rotationally asymmetric optical element includes a reflecting surface.

15. The rotationally asymmetric optical system according to claim 1, which satisfies the following conditions (1) and (2) with respect to $\Delta Pm$ indicative of a power change due to an azimuth of said rotationally asymmetric optical element in a section including the center axis and $\Delta Ps$ indicative of a power change due to an azimuth of said rotationally asymmetric optical element in a section that is orthogonal to the section including the center axis and including a center ray:

$$\Delta Pm < 0.1(1/\text{mm}) \quad (1)$$

$$\Delta Ps < 0.1(1/\text{mm}) \quad (2).$$

16. The rotationally asymmetric optical system according to claim 1, wherein said rotationally asymmetric optical element is located rotatably about the center axis.

17. The rotationally asymmetric optical system according to claim 16, wherein a second rotationally asymmetric optical element is located in such a way as to surround a full circumference of said rotationally asymmetric optical element, wherein said second optical element is located rotatably about said rotationally asymmetric optical element and about an axis parallel with the center axis.

18. The rotationally asymmetric optical system according to claim 1, wherein an entrance pupil of said full-panoramic optical system lying in a section including the center axis is positioned near a transmitting surface that forms said entrance surface of said full-panoramic optical system.

19. The rotationally asymmetric optical system according to claim 1, wherein at least one reflecting surface of said full-panoramic optical system is of a rotationally symmetric shape defined by rotation about the center axis of a line segment of any arbitrary shape including an odd-number degree term.

20. The rotationally asymmetric optical system according to claim 1, wherein said full-panoramic optical system has a flare stop located near an entrance pupil in a section including the center axis, wherein said flare stop is adapted to limit an aperture only in the section including the center axis.

* * * * *